US012245680B2

(12) United States Patent
Saranow et al.

(10) Patent No.: US 12,245,680 B2
(45) **Date of Patent: *Mar. 11, 2025**

(54) COLOR CONVERSION SYSTEM AND METHOD

(71) Applicant: B&R Holdings LLC, Chicago, IL (US)

(72) Inventors: Mitchell H. Saranow, Winnetka, IL (US); Michael Wright, Lisle, IL (US)

(73) Assignee: B&R Holdings LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/622,567

(22) Filed: Mar. 29, 2024

(65) Prior Publication Data

US 2024/0324754 A1 Oct. 3, 2024

Related U.S. Application Data

(63) Continuation of application No. 17/581,737, filed on Jan. 21, 2022, now Pat. No. 11,950,683, which is a (Continued)

(51) Int. Cl.
*A45D 44/00* (2006.01)
*A45D 19/06* (2006.01)
(Continued)

(52) U.S. Cl.
CPC ........... *A45D 44/005* (2013.01); *A45D 19/06* (2013.01); *A45D 44/02* (2013.01); *B01F 33/846* (2022.01);
(Continued)

(58) Field of Classification Search
CPC ....... A45D 44/005; A45D 19/06; A45D 44/02
See application file for complete search history.

(56) References Cited

U.S. PATENT DOCUMENTS 3,122,272 A 2/1964 Marsh
3,416,517 A 12/1968 Adams et al.
(Continued)

FOREIGN PATENT DOCUMENTS

DE 203 07 083 U1 9/2003
DE 10 2005 031 269 B3 12/2006
(Continued)

OTHER PUBLICATIONS

Berns, *Billmeyer and Salzman's Principles of Color Technology*, Fourth Edition, Chapter 9, "Optical Modeling of Colored Materials," pp. 169-188, John Wiley & Sons, Inc., 2019. (20 pages).

*Primary Examiner* — Jason K Niesz
(74) *Attorney, Agent, or Firm* — Seed IP Law Group LLP

(57) ABSTRACT

A method is provided for preparing a hair dye color mixture. The method includes: accessing a control system having at least a processor, a memory, and user input controls, the memory configured to store ingredients of a hair dye color mixture, receiving user input from the user input controls to change one or more ingredients of the hair dye color mixture to a new product brand; matching the color of the hair dye color mixture using one or more ingredients of the new product brand, in response to the user input; and displaying the ingredients of the hair dye color mixture in the new product brand on a display.

20 Claims, 22 Drawing Sheets

Related U.S. Application Data continuation of application No. 17/118,043, filed on Dec. 10, 2020, now Pat. No. 11,246,395, which is a continuation of application No. 16/228,559, filed on Dec. 20, 2018, now Pat. No. 10,893,740, which is a continuation of application No. 15/839,414, filed on Dec. 12, 2017, now Pat. No. 10,182,638, which is a continuation of application No. 15/237,503, filed on Aug. 15, 2016, now Pat. No. 9,839,278, which is a continuation of application No. 13/371,928, filed on Feb. 13, 2012, now Pat. No. 9,414,665, which is a continuation-in-part of application No. 12/986,448, filed on Jan. 7, 2011, now Pat. No. 8,567,455, which is a continuation-in-part of application No. 12/849,427, filed on Aug. 3, 2010, now Pat. No. 8,393,363, which is a continuation-in-part of application No. 12/396,050, filed on Mar. 2, 2009, now Pat. No. 7,963,303.

(60) Provisional application No. 61/442,553, filed on Feb. 14, 2011, provisional application No. 61/115,960, filed on Nov. 19, 2008, provisional application No. 61/033,053, filed on Mar. 3, 2008.

(51) Int. Cl.
*A45D 44/02* (2006.01)
*B01F 33/84* (2022.01)
*B01F 35/88* (2022.01)
*B01F 101/21* (2022.01)

(52) U.S. Cl.
CPC .......... *B01F 33/848* (2022.01); *B01F 35/881* (2022.01); *B01F 2101/21* (2022.01)

(56) References Cited

U.S. PATENT DOCUMENTS 3,878,907 A 4/1975 Morick
4,046,287 A 9/1977 Hoekstra et al.
4,434,467 A * 2/1984 Scott ...................... H04N 5/272 715/962
4,469,146 A 9/1984 Campbell et al.
4,637,527 A 1/1987 Arrigoni
4,656,600 A 4/1987 Swann
4,697,938 A 10/1987 Sakura et al.
4,705,083 A 11/1987 Rossetti
4,792,236 A 12/1988 Heinis et al.
4,840,239 A 6/1989 Slagg
4,871,262 A 10/1989 Krauss et al.
4,967,938 A 11/1990 Hellenberg
5,078,302 A 1/1992 Hellenberg
5,119,973 A 6/1992 Miller et al.
5,153,825 A 10/1992 Yauk et al.
5,163,010 A 11/1992 Klein et al.
5,193,720 A 3/1993 Mayberry
5,268,849 A 12/1993 Howlett et al.
5,328,057 A 7/1994 Hellenberg et al.
5,365,722 A 11/1994 Edwards et al.
5,368,196 A 11/1994 Hellenberg et al.
5,402,834 A 4/1995 Levin et al.
5,474,211 A 12/1995 Hellenberg
5,487,603 A 1/1996 Hoff et al.
5,493,840 A 2/1996 Cane
5,511,695 A 4/1996 Chia et al.
5,544,684 A 8/1996 Robinette, III
5,554,197 A 9/1996 Assini et al.
5,558,251 A 9/1996 Neri
5,632,314 A 5/1997 Koppe et al.
5,697,527 A 12/1997 Altieri, Jr. et al.
5,711,458 A 1/1998 Langeveld et al.
5,784,854 A 7/1998 Mazzalveri
5,855,626 A 1/1999 Wiegner et al.
5,862,947 A 1/1999 Wiegner et al.
5,938,080 A 8/1999 Haaser et al.
5,992,691 A 11/1999 Post et al.
6,003,731 A 12/1999 Post et al.
6,089,408 A 7/2000 Fox
6,164,499 A 12/2000 Chia
6,180,892 B1 1/2001 Li
6,191,371 B1 2/2001 Olberg et al.
6,360,961 B1 3/2002 Marazzi
6,490,492 B1 12/2002 Fertig et al.
6,510,366 B1 1/2003 Murray et al.
6,672,341 B2 1/2004 Bartholomew et al.
6,782,307 B2 8/2004 Wilmott et al.
6,856,861 B2 2/2005 Dirksing et al.
6,935,386 B2 8/2005 Miller et al.
6,991,004 B2 1/2006 Kaufhold et al.
7,099,740 B2 8/2006 Bartholomew et al.
7,121,430 B2 10/2006 Mink et al.
7,147,012 B2 12/2006 Kaufhold et al.
7,185,789 B2 3/2007 Mink et al.
7,557,311 B2 7/2009 Umemoto
7,654,416 B2 2/2010 Buining et al.
7,690,405 B2 4/2010 Miller et al.
7,873,435 B2 1/2011 Yuyama et al.
7,963,303 B2 6/2011 Saranow et al.
8,336,582 B2 12/2012 Saranow
8,393,358 B2 3/2013 Saranow
8,897,915 B2 11/2014 Saranow
9,073,026 B2 7/2015 Engels et al.
9,149,108 B2 10/2015 Miller et al.
9,177,339 B2 11/2015 Saranow et al.
9,414,665 B2 8/2016 Saranow et al.
9,504,306 B2 11/2016 Miller et al.
9,524,605 B2 12/2016 Saranow et al.
9,567,118 B2 2/2017 Rodrigues
9,839,278 B2 12/2017 Saranow et al.
9,877,569 B2 1/2018 Miller et al.
9,919,278 B2 3/2018 Saranow et al.
10,143,984 B2 12/2018 Krom, Jr. et al.
10,182,638 B2 1/2019 Saranow et al.
10,716,386 B2 7/2020 Miller et al.
10,897,979 B1 1/2021 Nash et al.
11,246,395 B2 2/2022 Saranow et al.
11,344,103 B2 5/2022 Nash et al.
11,375,801 B2 7/2022 Miller et al.
2002/0071604 A1 6/2002 Orpaz et al.
2002/0124017 A1 9/2002 Mault
2003/0065450 A1 4/2003 Leprince
2004/0103035 A1 5/2004 Pitsch
2004/0122553 A1 6/2004 Phan et al.
2004/0159676 A1 8/2004 Adema
2004/0243259 A1 12/2004 Peterson et al.
2004/0247421 A1 12/2004 Saunders et al.
2005/0092772 A1 5/2005 Miller et al.
2005/0130613 A1 6/2005 Kutsana et al.
2005/0165705 A1 7/2005 Lauper et al.
2005/0194403 A1 9/2005 Mink et al.
2005/0252934 A1 11/2005 Miller et al.
2005/0264794 A1 12/2005 Inzinna, Jr. et al.
2005/0278870 A1 12/2005 Gaspini
2006/0033907 A1* 2/2006 Inzinna, Jr. ............... G01J 3/46 356/45
2006/0124743 A1 6/2006 Venema et al.
2006/0181707 A1 8/2006 Gibson et al.
2006/0231578 A1 10/2006 Mink et al.
2006/0261089 A1 11/2006 Mink et al.
2006/0283521 A1 12/2006 Bartholomew et al.
2007/0044863 A1 3/2007 Engels et al.
2007/0084520 A1 4/2007 Driessen et al.
2007/0124009 A1 5/2007 Bradley et al.
2007/0199159 A1 8/2007 Schmenger et al.
2007/0222547 A1 9/2007 Stahle et al.
2008/0178399 A1 7/2008 Vena et al.
2009/0218007 A1 9/2009 Saranow et al.
2009/0248199 A1 10/2009 Milhorn
2010/0175931 A1 7/2010 Amato
2010/0318220 A1 12/2010 Saranow et al.
2011/0100504 A1 5/2011 Saranow et al.
2012/0075331 A1 3/2012 Mallick et al.

(56) References Cited

U.S. PATENT DOCUMENTS

| | | | |
|---|---|---|---|
| 2012/0127819 | A1 | 5/2012 | Saranow et al. |
| 2012/0152406 | A1 | 6/2012 | Bartholomew et al. |
| 2013/0123923 | A1 | 5/2013 | Pavlov et al. |
| 2013/0123973 | A1 | 5/2013 | Saranow et al. |
| 2013/0261798 | A1 | 10/2013 | Saranow et al. |
| 2014/0082854 | A1 | 3/2014 | Landa et al. |
| 2015/0082553 | A1 | 3/2015 | Landa et al. |
| 2015/0089751 | A1 | 4/2015 | Landa et al. |
| 2017/0035186 | A1 | 2/2017 | Saranow et al. |
| 2017/0071317 | A1 | 3/2017 | Miller et al. |
| 2017/0119130 | A1 | 5/2017 | Witchell et al. |
| 2017/0189870 | A1 | 7/2017 | Saranow et al. |
| 2017/0206678 | A1 | 7/2017 | Kowalczyk et al. |
| 2018/0103743 | A1 | 4/2018 | McKenzie et al. |
| 2018/0168321 | A1 | 6/2018 | Saranow et al. |
| 2018/0220777 | A1 | 8/2018 | Miller et al. |
| 2018/0257052 | A1 | 9/2018 | Saranow et al. |
| 2019/0144178 | A1 | 5/2019 | McKenzie et al. |
| 2019/0218002 | A1 | 7/2019 | McKenzie et al. |
| 2020/0015574 | A1 | 1/2020 | Witchell et al. |
| 2020/0121583 | A1 | 4/2020 | Russell |
| 2020/0239206 | A1 | 7/2020 | McKenzie et al. |
| 2022/0297907 | A1 | 9/2022 | McKenzie et al. |
| 2022/0332481 | A1 | 10/2022 | McKenzie et al. |

FOREIGN PATENT DOCUMENTS

| | | | |
|---|---|---|---|
| EP | 0 484 564 | A1 | 5/1992 |
| EP | 1 093 842 | A1 | 4/2001 |
| EP | 1 240 845 | A1 | 9/2002 |
| EP | 2 193 781 | A1 | 6/2010 |
| FR | 2 619 730 | A1 | 3/1989 |
| JP | 58-41966 | A | 3/1983 |
| JP | 5-140470 | A | 6/1993 |
| JP | 2002-15056 | A | 1/2002 |
| JP | 2002-123723 | A | 4/2002 |
| JP | 2002-524172 | A | 8/2002 |
| JP | 2003-33217 | A | 2/2003 |
| JP | 2009-536532 | A | 10/2009 |
| JP | 2012-510104 | A | 4/2012 |
| KR | 2000-0059262 | A | 10/2000 |
| TW | 200831887 | A | 8/2008 |
| TW | 201022980 | A1 | 6/2010 |
| WO | 02/083282 | A1 | 10/2002 |
| WO | 03/090914 | A2 | 11/2003 |
| WO | 2004/101689 | A2 | 11/2004 |
| WO | 2010/058381 | A1 | 5/2010 |
| WO | 2010/100231 | A1 | 9/2010 |
| WO | 2011/024160 | A1 | 3/2011 |
| WO | 2012/112497 | A2 | 8/2012 |

* cited by examiner

COLOR CONVERSION SYSTEM AND METHOD

FIELD OF THE DISCLOSURE

The present disclosure relates to an inventory management and control for a color system for the combination of components to produce a desired mixture along with the management of the components, information, and businesses dealing with the same.

BACKGROUND

The present disclosure can be used in various fields and have various applications. In one such field, namely, cosmetics and hair dye preparations, the current field packages hair dyes in small containers, including but not limited to various sizes of tubes and bottles. They further provide salons with recipe chart(s) that show how much of ingredient "A" is to be mixed with how much of ingredients "B" and "C" and "D" to produce the desired end color. To produce the desired color, the colorist must first locate the required ingredients. This can be a challenge unto itself at a busy salon with multiple colorists. In addition, with as many as 60 or more ingredients in each manufacturer's colorant lines, using the correct materials in the right amounts is very important. After selecting the color to be used, the next step is to squeeze or pour the approximate amounts of each ingredient into a mixing bowl. Various coarse measurement techniques are currently used, so there is very little control over the end product. This current method employed by most salons lacks precision and control and does not ensure correct results. Stock color recipes are listed on a color chart provided by the colorant manufacturer. Color formulations are often adjusted to suit a particular customer's needs. These custom colors are typically recorded on 3×5 cards or other prepared means and filed away for future reference. The drawbacks to this approach include: inaccurate volumetric measurements ("add ½ capful . . . " "squeeze tube to line . . . "); end results that are highly dependent on operator skill level or chance; no controls are available to monitor outcomes; hand-written customer records have no backups; and the whole process is devoid of meaningful information and control. Overall, this creates a cluttered, improper, and disorganized process totally devoid of accurate measurement.

Fully-automatic computer-controlled dispensers designed for hair coloring materials were introduced in the 1990's to address the weaknesses of the current hand-mixing process. Most of these models sold for $10,000 to $20,000, making these dispensers unaffordable for virtually all salons. These dispensers automatically measured the correct amount of each ingredient with great precision and a software database stored the stock color recipes as well as specially created blends and since the formulation and customer information were stored electronically, locating the required information was easy. Files could also be backed up so valuable customer history data was more secure and easily shared with other locations.

However, these earlier automatic dispensers had one very serious drawback, they required specially-designed internal storage bags for the various color components. These containers typically were designed to hold one or two liters and were specially constructed to eliminate the possibility of air infiltration, which could oxidize and ruin the dye. Unfortunately, the required bulk packaging further required manufacturers to incur very sizeable, multi-million dollar capital costs to add additional manufacturer's filling lines and to produce the special containers. Additionally, major drawbacks of the automatic dispensers included their high cost, extreme complexity, high maintenance requirements, and as noted, their requirement that hair color producers incur high cost capital investments to meet the automatic dispensers' unique packaging requirements. Therefore, the project was deemed uneconomical and did not go forward. This failure created a need for a much simpler, more cost-effective approach which eliminates the drawbacks of earlier designs.

When a person needs to blend or mix a number of components, the need to eliminate waste, create a cost-effective approach to aid the user, and provide a process that produces the desired mixture is highly desired. There is a need to provide a monitored approach, coupled with accurate measurement means to eliminate the potential for error and improve the overall accuracy, while producing accurate measurements, information to control the whole process.

SUMMARY

One or more of the embodiments in the present disclosure aims to bring control to an otherwise un-controlled process at a substantial reduced cost (about $2500-$3500). One or more of the current embodiments solves problems that have existed but have never been solved since the development of professional hair coloring salons. The new monitored approach disclosed herein includes a computer driven system with precision scale, a computer-based recipe management system and optional storage to manage and protect blending ingredients, and will, if necessary, lock to minimize theft as well as a color management system for the combination of components to produce a desired mixture along with the management of the components, information, and businesses dealing with the same. Every color management system has a blending station with the company's proprietary color blending management software. The blending station includes a keyboard, LCD screen which may be a touch screen and a scale in communication with the computer to provide feedback on exactly how much of a each ingredient has actually been added to the batch. The computer driven system may also contain storage drawers or other receptacles to organize and store the individual blending components. Each receptacle may have an LED or other indicator to simplify product selection which is controlled by the computer driven system. Each receptacle may also have electronically controlled locking mechanisms, which are also driven by the system to reduce theft. In addition, the color management system can be enhanced with an optional bar code reader to verify the ingredients against the color recipe and to facilitate inventory control.

In one embodiment there is provided a color management system for preparation of mixtures, such as, but not limited to, hair dye mixtures, personal care product mixtures, and the like. The color management system includes a computer driven system having at least a memory, input controls, and a display. The memory has the capacity to store at least one mixture formula for the mixing of one or more components, such as, but not limited to, colorants, dyes, and/or blending materials. The color management system also includes a scale communicating with the computer system, which monitors a weight on the scale and provides information on changes thereto. In addition, the computer system, upon receiving an input for a creation of a mixture, displays a formulation of the mixture indicating the component(s) and amount(s) needed to create the desired mixture.

In an aspect, a method is provided for preparing a hair dye mixture. The method includes having a scale and control system in communication with each other. The control system provides for a memory and a display, wherein the memory contains a formula defining instructions for blending a hair dye mixture. The method displays the instructions on the display. The user may then view the display of instructions and then adds to a receptacle on the scale, colorant(s) and dye blending material(s) in accordance with the instructions by using hair color manufacturers' standardized packaging, such that non-standardized or specialized packaging of colorants and/or dye blending materials are not required.

In other aspects of some embodiments, there is provided a computer system that monitors changes in the weight on the scale and adjusts (i.e., reformulates) the formulation when a weight of a component added to the mixture is different (larger or smaller) than a recommended formulated amount and the computer system receives an input to adjust the formulas to the newly determined reconfigured weight of the component. The computer system may also monitor changes in the weight on the scale and displays a difference between a recommended formulated amount of a component and an amount of the component added and measured by the scale. The differences displayed may also be measured down to a zeroed amount left to indicate how much additional of each other component is needed to be added to reach the recommended formulation. The computer system may also be linked to the salon's management software to exchange information on customers and formulas associated with particular customers. The computer system may store in the memory any changes in the formulation of the mixture. The computer system may also store in the memory any changes in the formulation of the mixture and send the changes in the formulation of the mixture to the salon's management software.

Yet in other aspects, the color management system may adjust the formulation of a mixture upon receiving an input on a total amount of mixture required or a strength of the mixture. Yet further aspects provide for receiving an input that the mixture is a custom color, custom color software acts to display a listing of components and blending materials, activates indicator(s) for particular selected component(s), monitors a separate amount and a total amount of the components placed in the bowl or other container, and stores a formulated mixture upon receiving an input the mixture is accepted and completed.

In another embodiment, the operator enters a customer name into the computer, and the computer displays the customer's history, which may include the formulas stored and previously used for the customer. If this is a new customer, a history file is created and the operator selects desired components from a pallet chart, recipe book, or customer history file; enters the required amount of finished components and finally the activator strength is selected. The operator is instructed to place an empty batch bowl on the scale and the system then prompts the operator for the first component, and an LED or other indicator adjacent to the corresponding receptacle is illuminated and/or the receptacle is automatically unlocked and/or opened. The operator adds the amount indicated on the display panel, while the scale monitors exactly how much has been added and provides feedback to the operator as to when to stop adding, leading to an extremely accurate dispense. After returning the bottle, tube, or other container to the designated storage receptacle, the operator presses "next," which closes and locks the storage receptacle and the next LED or other indicator is activated and the corresponding next receptacle is unlocked and/or opened to provide access to the next ingredient. Bar code readers can also be used to control the ingredient solution and control process. Afterwards a batch record is placed in the customer's history file.

BRIEF DESCRIPTION OF THE DRAWINGS

A fuller understanding of the foregoing may be had by reference to the accompanying drawings, wherein.

DETAILED DESCRIPTION OF THE EMBODIMENTS

Figure 1A:
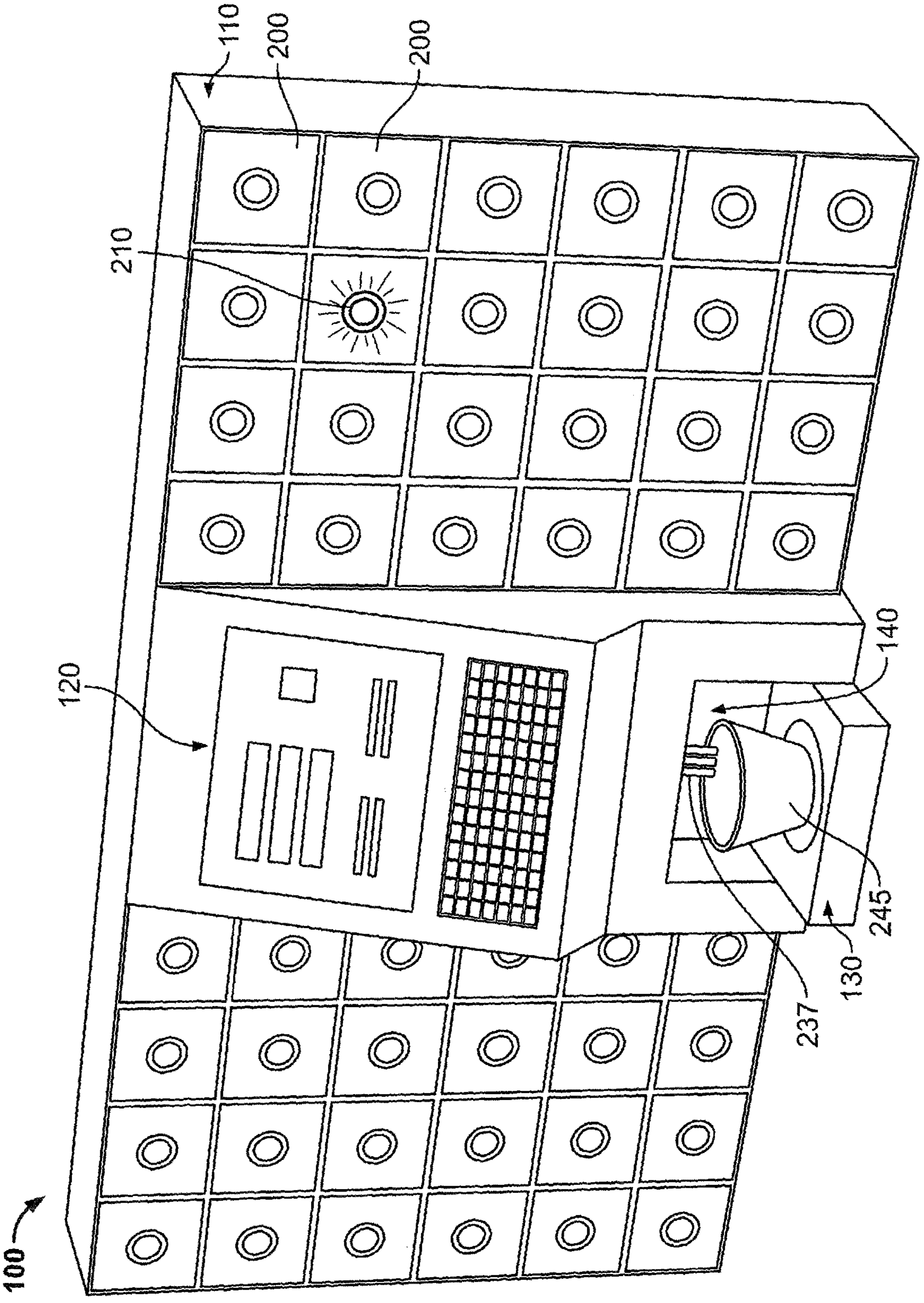
FIG. 1A is a perspective view of one embodiment of a system designed to control a manual process for mixing components, which includes a mixing station and optional storage receptacles.

While the disclosure is susceptible to embodiments in many different forms, there are shown in the drawings and will be described herein, in detail, the preferred embodiments of the present disclosure. It should be understood, however, that the present disclosure is to be considered an exemplification of the principles of the invention and is not intended to limit the spirit or scope of the invention, claims and/or embodiments illustrated.

In one embodiment, there is shown and described a system designed to control a process for mixing components and which brings control to an otherwise uncontrolled process. The components can be various ingredients to a mixture, such as, dyes used for blending hair dye mixtures, components used for blending personal beauty products, foods, and the like. In one aspect, there is provided for a method for preparing a hair dye mixture. By definition throughout, the method may be performed as a manual process, semi-manual, or automatic process. In a manual process the stylist manually adds the components of the mixtures to a bowl by following instructions provided. The stylist will thus retrieve the individual components from receptacles and squeeze the contents into the bowl or other container on the scale. In a semi-manual process, the stylist is still retrieving the components from the receptacles. However, the addition of the component contents into the bowl may be with the aid of mechanical help such as an extruder, mechanical squeezer, and the like. In a limited aspect, an automatic process may also be covered by the method if the automatic machine retrieved standardized packaging components (as defined below) from storage or the receptacles. This can be conceived if a machine arm with pinchers is automatically controlled to retrieve the packaging components from storage areas and then returned the components after use.

As defined throughout this application the term manufacturers' standardized packaging is an extremely important concept and is thus defined as packaging components of raw materials generally available to a vast majority of professional salons through normal distribution channels. The standardized packaging is contrasted with non-standardized or specialized packaging, which is defined as custom packaging of raw material designed for specific applications or specific machines used in the hair-dye industry and which require specific sizes, quantities, or characteristics of containers and raw materials and not generally available to the industry but rather to only one or a few industry participants. For example, an automatic hair dye mixing and dispensing machine will require specialized packaging of the raw materials in order to fit and be compatible with the automatic dispensing machine.

Figure 1B:
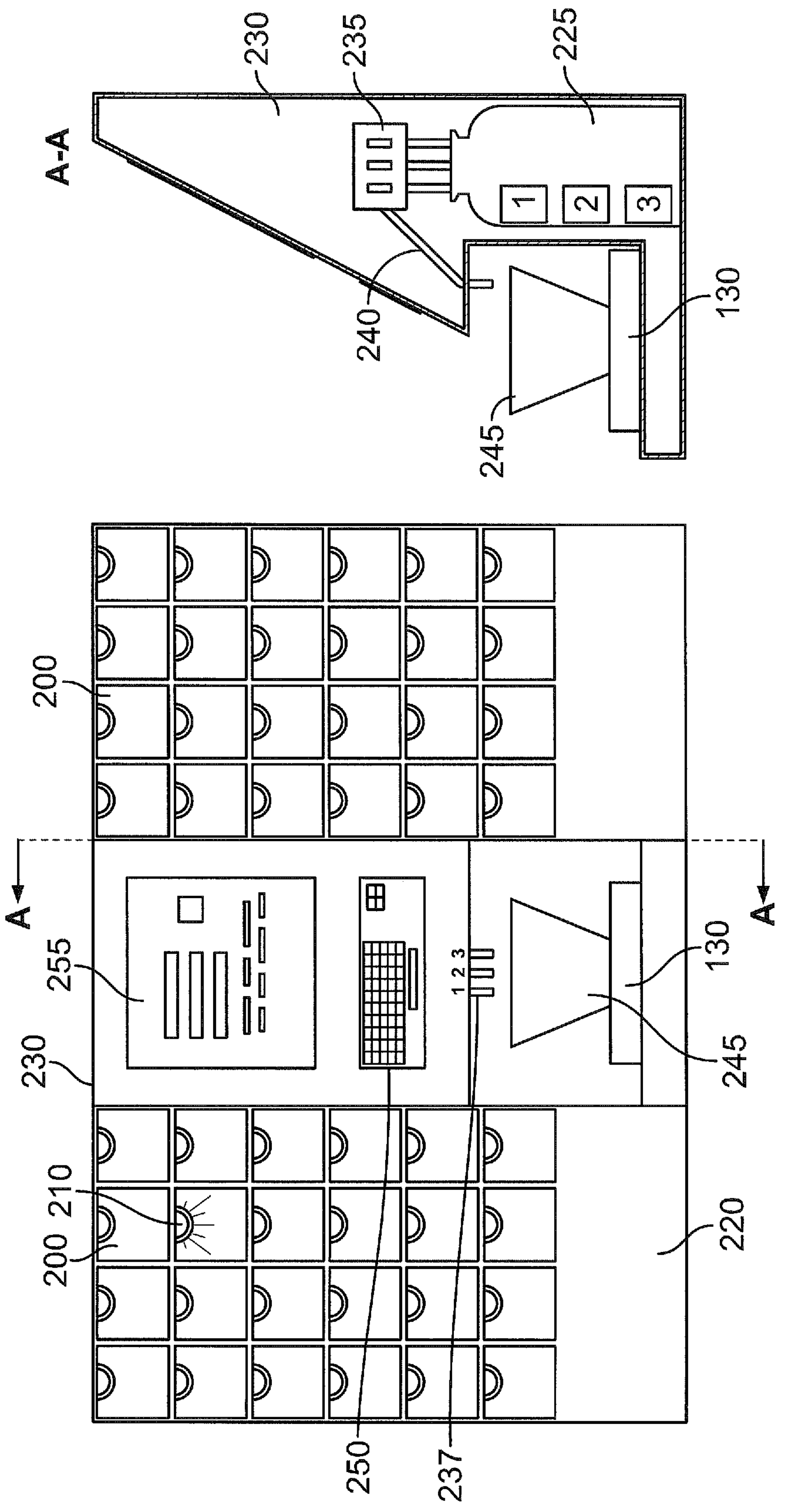
FIG. 1B is a first and cross-sectional view of the embodiment from FIG. 1A.
Figure 2:
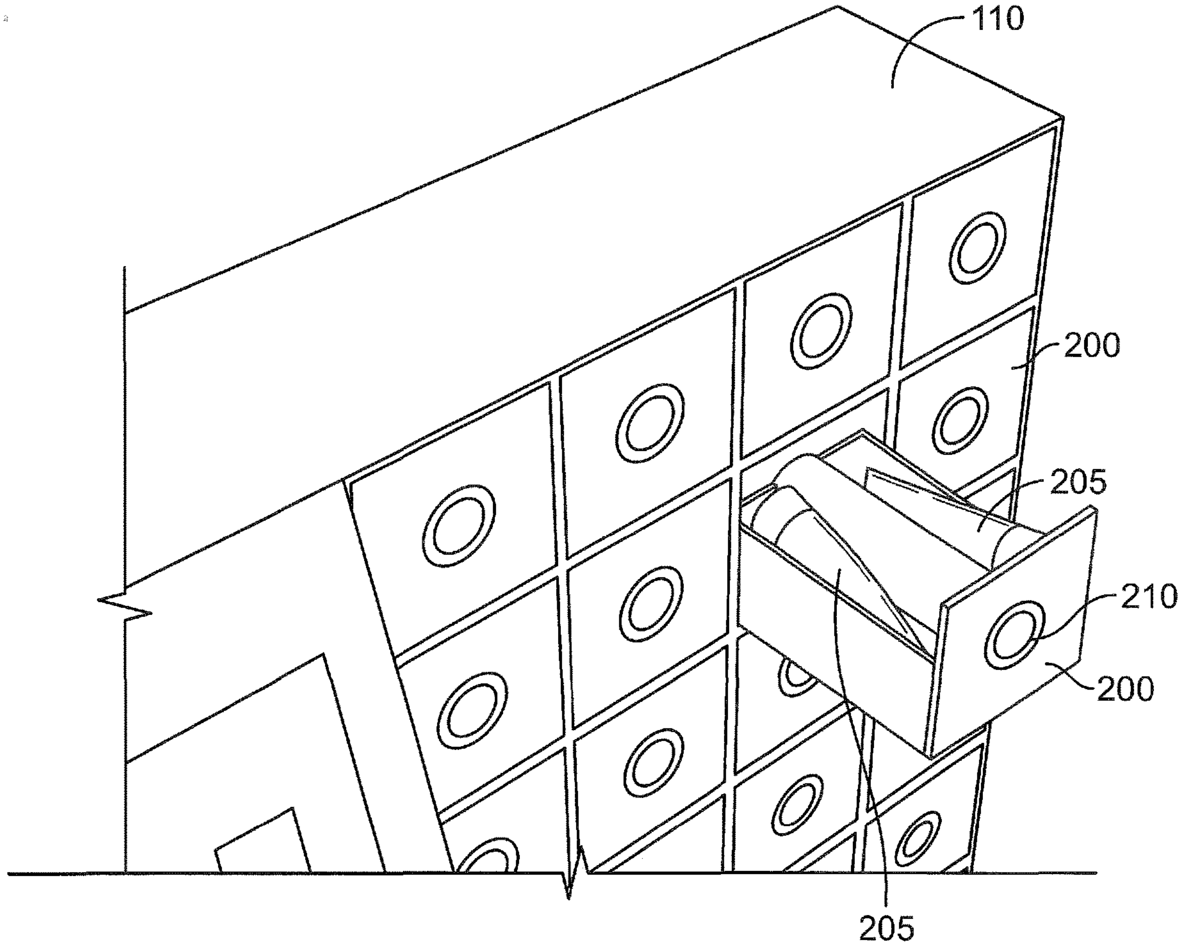
FIG. 2 is an enlarged view of a receptacle from FIG. 1A showing storage areas for the components.

Referring now to FIG. 1 shows one embodiment of the system, generally referenced as number 100. The system 100 includes organized storage of the components 110 (such as in one example, color blending ingredients), a computer-driven system 120, a small electronic scale 130 to be used in monitoring the mixing or blending process. In addition, the system may, but need not, include self-contained pumps 140 and/or tanks, to add common activators or ingredients, such as peroxides.

As shown in FIGS. 1-13, a number of different embodiments of the system 100 are illustrated. Each system 100 contains a number of bins, drawers, or receptacles 200 to organize and store the individual components, such as blending dye ingredient containers/tubes 205. Each receptacle 200 has an associated LED or other indicator 210 driven by the system 220. A small digital scale 130 is electrically connected to the system 220 to provide feedback to the system 220 on exactly how much of a given ingredient or activator was added to the specific batch.

While not necessarily the preferred embodiment, it is possible to include several small reservoirs 225 of common ingredients, such as bases and additives, stored within a storage area 230. The reservoirs 225 are coupled with metering pumps 235 to measure the common ingredients which eject from nozzles 237 into a mixture batch. Pumping channels 240 are also automatically controlled by the system 220. As illustrated, the common ingredients are either manually added or in the case of the above pumping system automatically pumped into a mixing bowl 245.

One embodiment of the present disclosure would be as follows:

(a) an operator enters/views the customer name or other identifying characteristic into the system 220 via an integral keyboard 250 or touchpad and display panel 255;

(b) the system 220 has a memory storing customer information and/or history of the customer's mixture, such as a specific or predefined color scheme; the system similarly allows editing, adding, and deleting of customer information or formula;

(c) the operator may either select a previously stored desired finished mixture or dye color from the customer history, or from an available list of known ingredients formulate a new formula;

(d) the operator is then prompted to enter the required amount of finished product (for example whether the operator needs 1 ounce, 2 ounces, and the like, of different ingredients.

(e) the operator is then instructed to place an empty batch mixing bowl 245 on the scale 130;

(f) the system 220 will then illuminate or activate an LED or other type of indicator 210 adjacent to a corresponding receptacle prompting the operator to select the specific component needed for the mixture; optionally the system may control locking mechanisms on the receptacles to electronically open/close or lock/unlock the desired storage receptacles;

(g) the operator adds the amount of component that is indicated on the display panel 255 to the bowl 245; while the amount is being added, the computer system 220 monitors the scale 130 to determine exactly how much has been added; the display panel 255 indicates how close the addition is to the target weight by displaying how much more must be added and provides feedback to the operator; this may be done by graphic or other types of indicators as noted herein. In one aspect the graphic itself can be set such that regardless of the total amount that is needed (1 oz or 5 oz) the graphic will appear the same size on the display. The amount the graphic is filled will be scaled to accommodate the total amount needed. In comparison a graphic showing a 1 oz amount will fill at a faster rate than a graphic showing a 5 oz amount.

(h) after returning the component and closing the designated storage drawer/receptacle, the operator presses "next" (or any key specified by the computer system), and the next receptacle LED or other indicator is activated or illuminated or the receptacle is unlocked along with the required amount of the next component or ingredient;

(i) steps (g) and (h) are repeated until all of the required components or color ingredients and activators have been added;

(j) once the batch has been completed, the precise amount of all ingredients are recorded into the customer's history file.

Had this been a custom blended mixture, a separate software function would be selected. Under this function, the operator would tell the system which ingredients were being added or deleted, and the system would record the exact amount of each addition or deletion via the integrated scale. When the batch was complete, a record of the custom blend would be stored in the customer's history file.

It is herein noted that any type of computer system having a memory storage area, processor to run various programs, and other components well known in the computer industry can be used by the embodiments herein. The system can be wired or wirelessly communicating with the plurality of storage receptacles to control the LED or other indicators 210 or other lighting, electronic locks, opening/closing and/or sound elements to help identify the specific receptacle(s) the operator will be using and the required amount to be manually dispensed to the bowl 245 to mix the specific components. Further, the system is wired or wirelessly communicating with the electronic scale 130 and the monitor 255 to identify and display to the operator how much of a specific amount of component needs to be added into the bowl 245 and wired or wirelessly communicating with the storage receptacles when used.

On return visits, information stored would be available to precisely recreate the mixture. This concept revolutionizes the way a mixture is produced, and especially when applied to salons. It replaces a messy, uncontrolled mixing process with an easy-to-use, guided process to produce the exact mixture (such as an exact color of hair dye) time after time.

Figure 3:
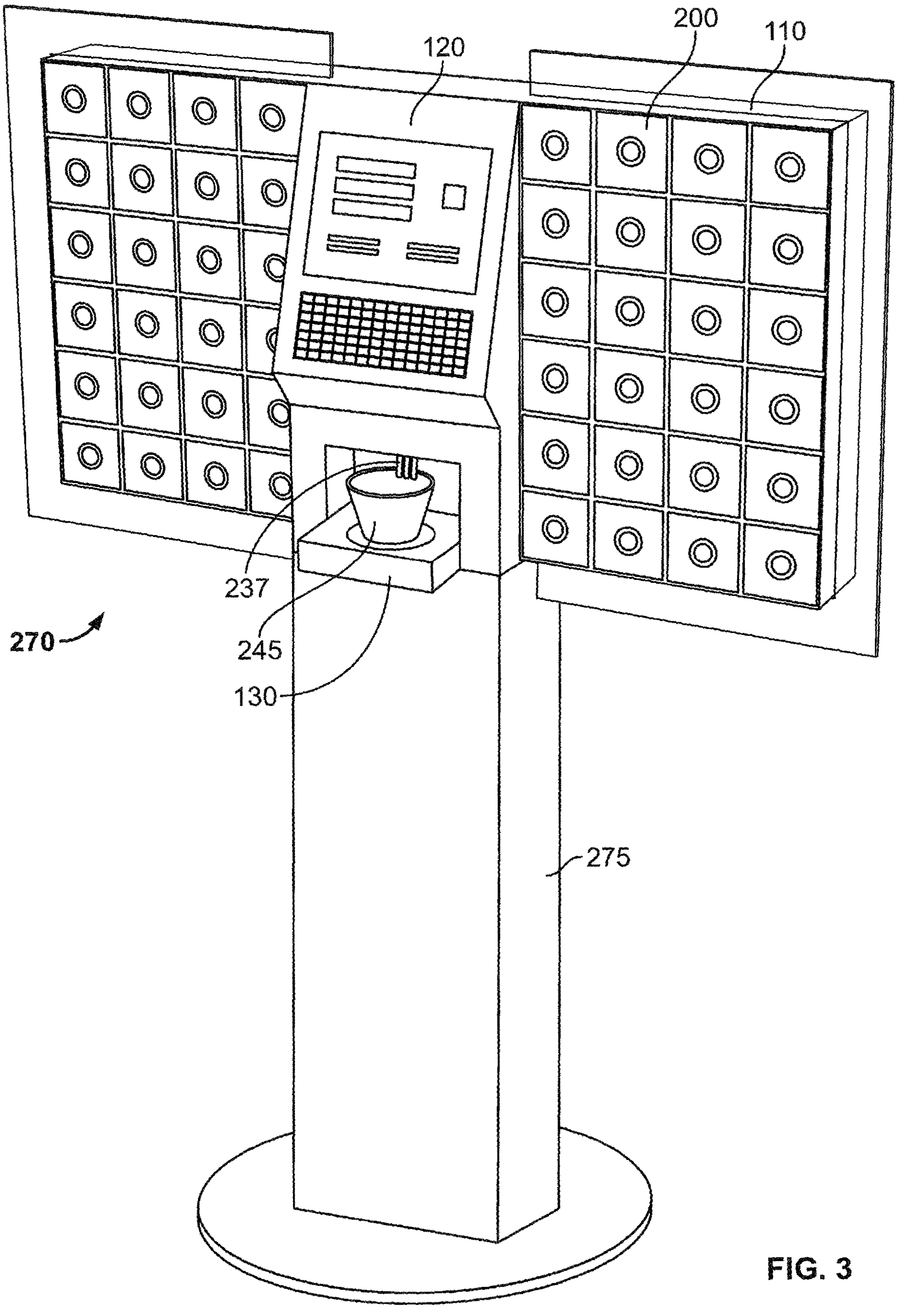
FIG. 3 is a perspective view of one embodiment of the system designed to control a process for mixing components, illustrating the use on a pedestal.
Figure 4:
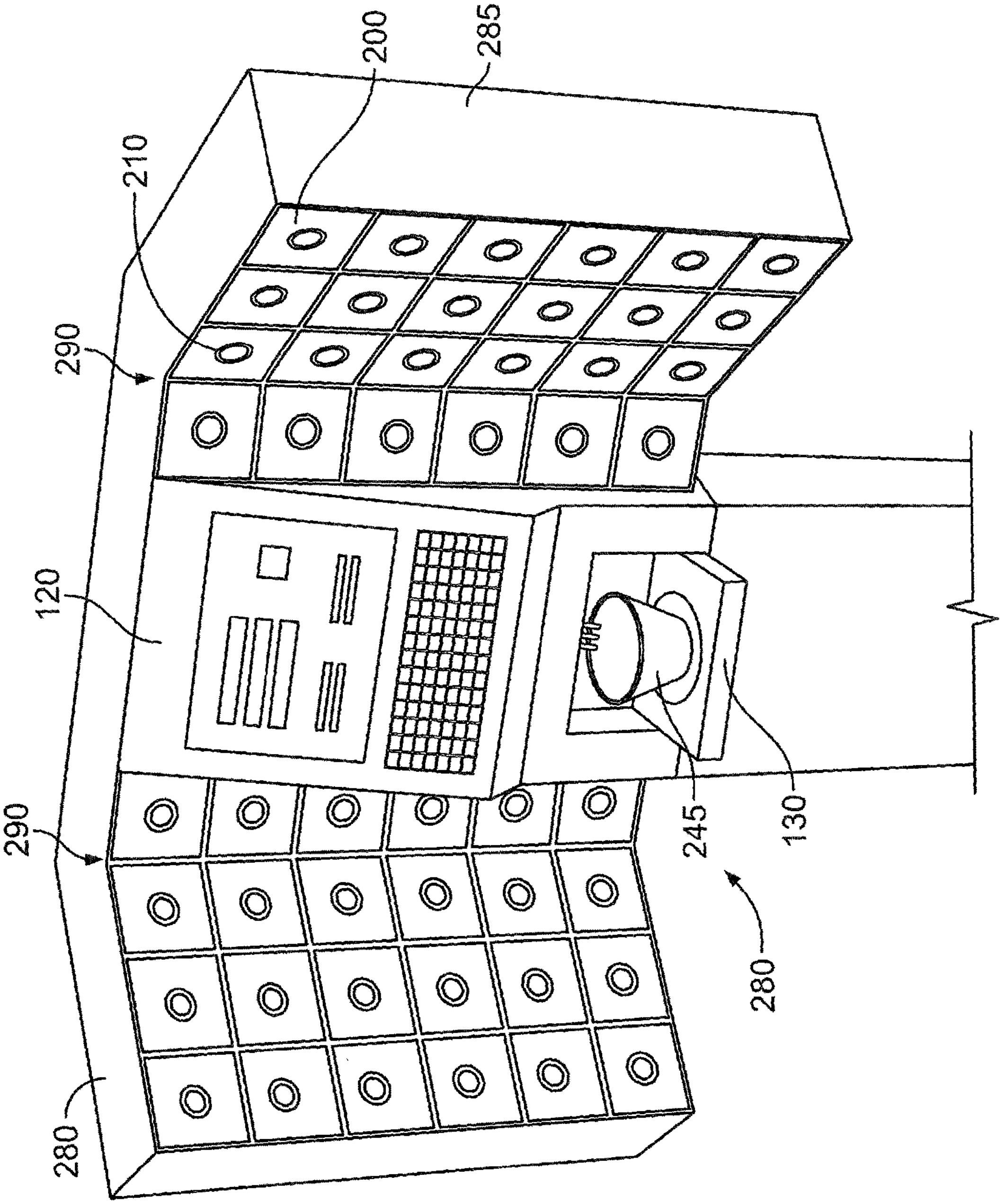
FIG. 4 is a perspective view of one embodiment of the system designed to control a process for mixing components, illustrating the use of curved receptacle storage areas.
Figure 5:
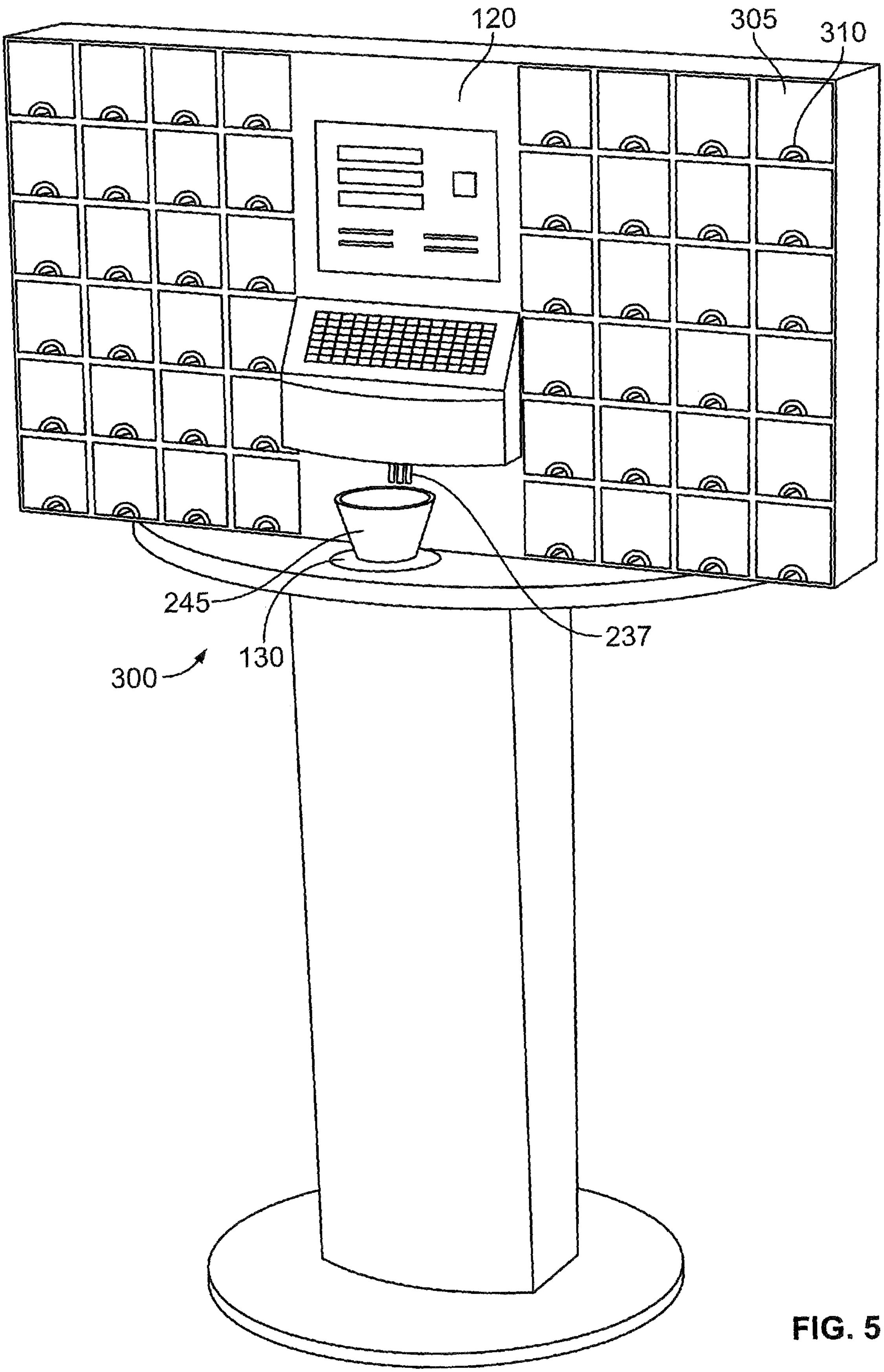
FIG. 5 is a perspective view of one embodiment of the system designed to control a process for mixing components, illustrating the use of receptacles with a change in the LED indicators.
Figure 6:
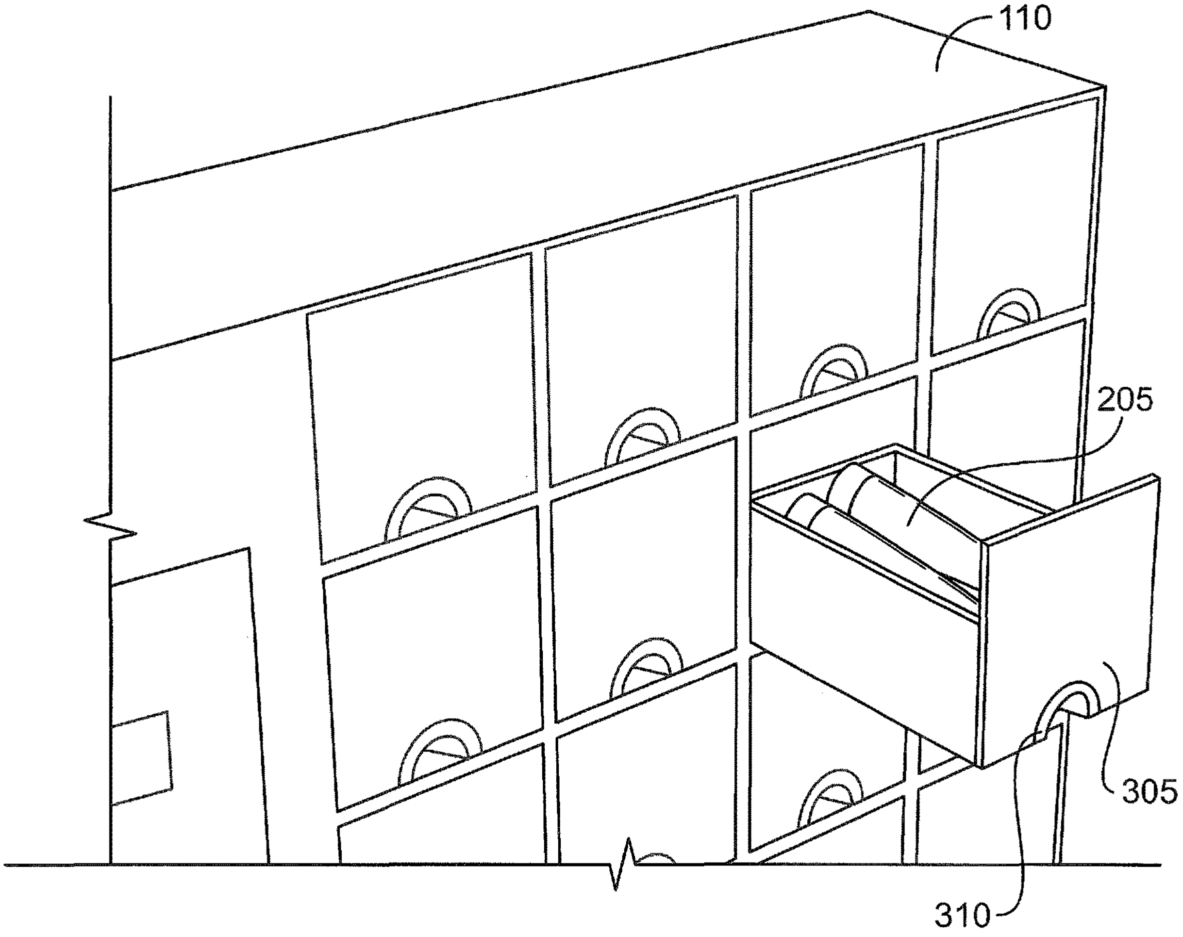
FIG. 6 is an enlarged view of a receptacle from FIG. 5.
Figure 22:
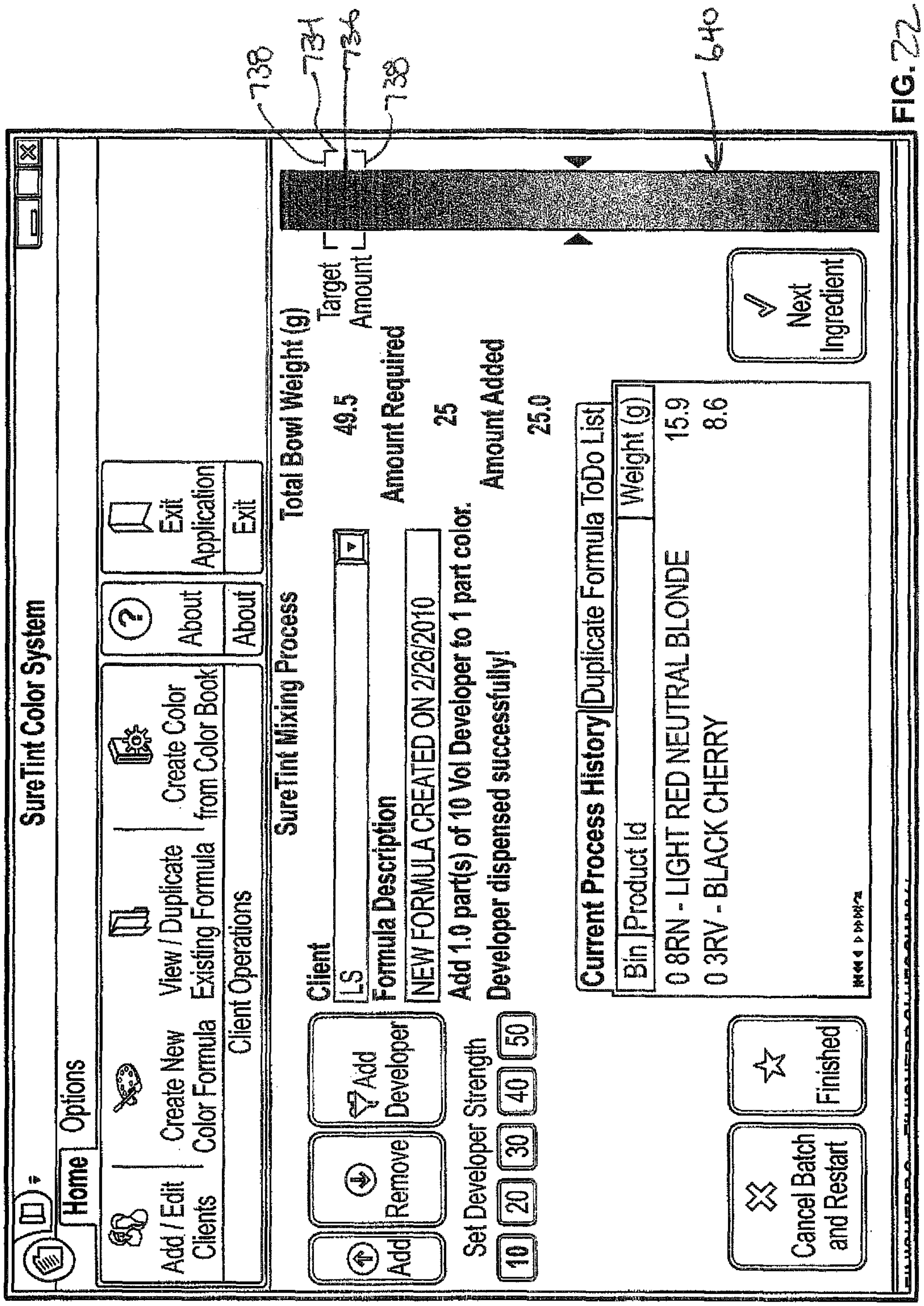
FIG. 22 is a screen shot of a color ingredient mixing system.

The systems can be configured in various manners. For example as illustrated in FIG. 1, the system is a counter-top model, while FIG. 3 shows a free-standing model 270 with a stand 275 so the system can stand on the floor. FIG. 4 shows a corner top model 280 with storage receptacle areas 285 that have curved sections 290. In addition FIG. 22 shows a various embodiment of the system with storage receptacles. In FIGS. 5-6 an alternative system 300 is shown with receptacles 305 that include LED indicators 310 on the bottom of each receptacle (as opposed to in the center, shown in the previous embodiments). In addition, in each embodiment the storage receptacles can be an optional piece to the system.

Figure 7:
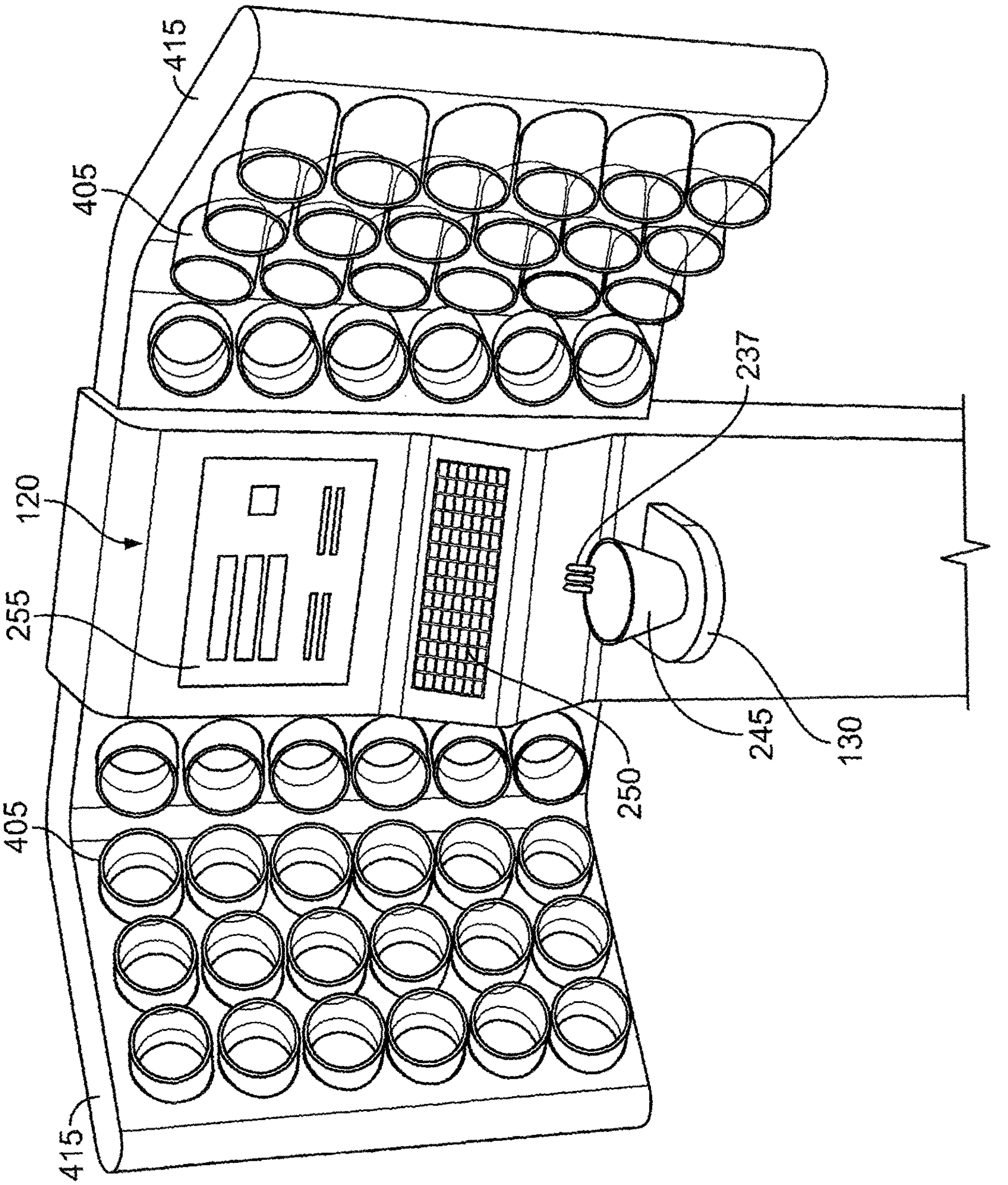
FIG. 7 is a perspective view of one embodiment of the system designed to control a process for mixing components, illustrating the use of slotted tubes as opposed to receptacles.
Figure 8:
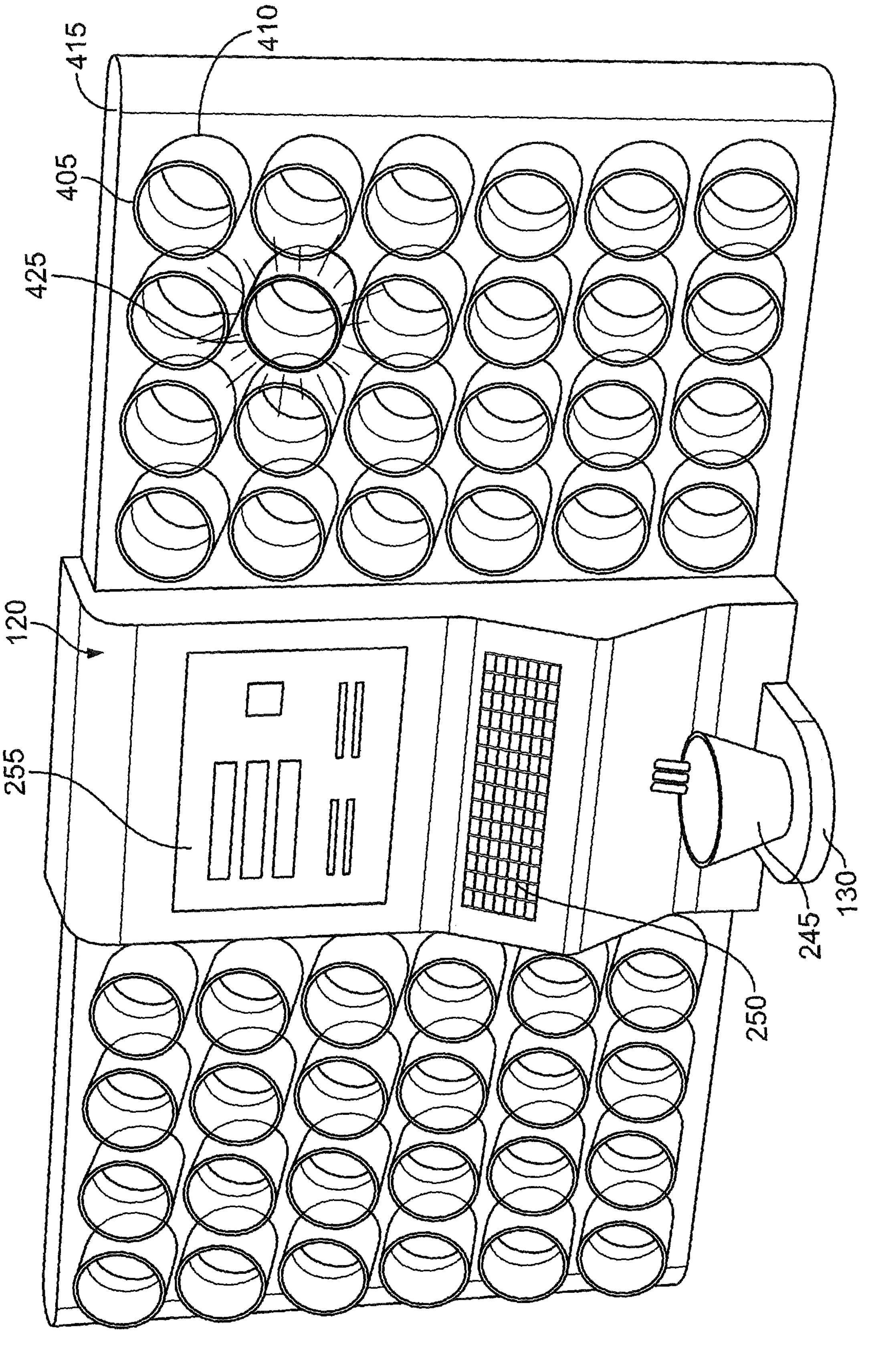
FIG. 8 is a perspective view of one embodiment of the system designed to control a process for mixing components, illustrating the use of slotted tubes as opposed to receptacles.
Figure 9:
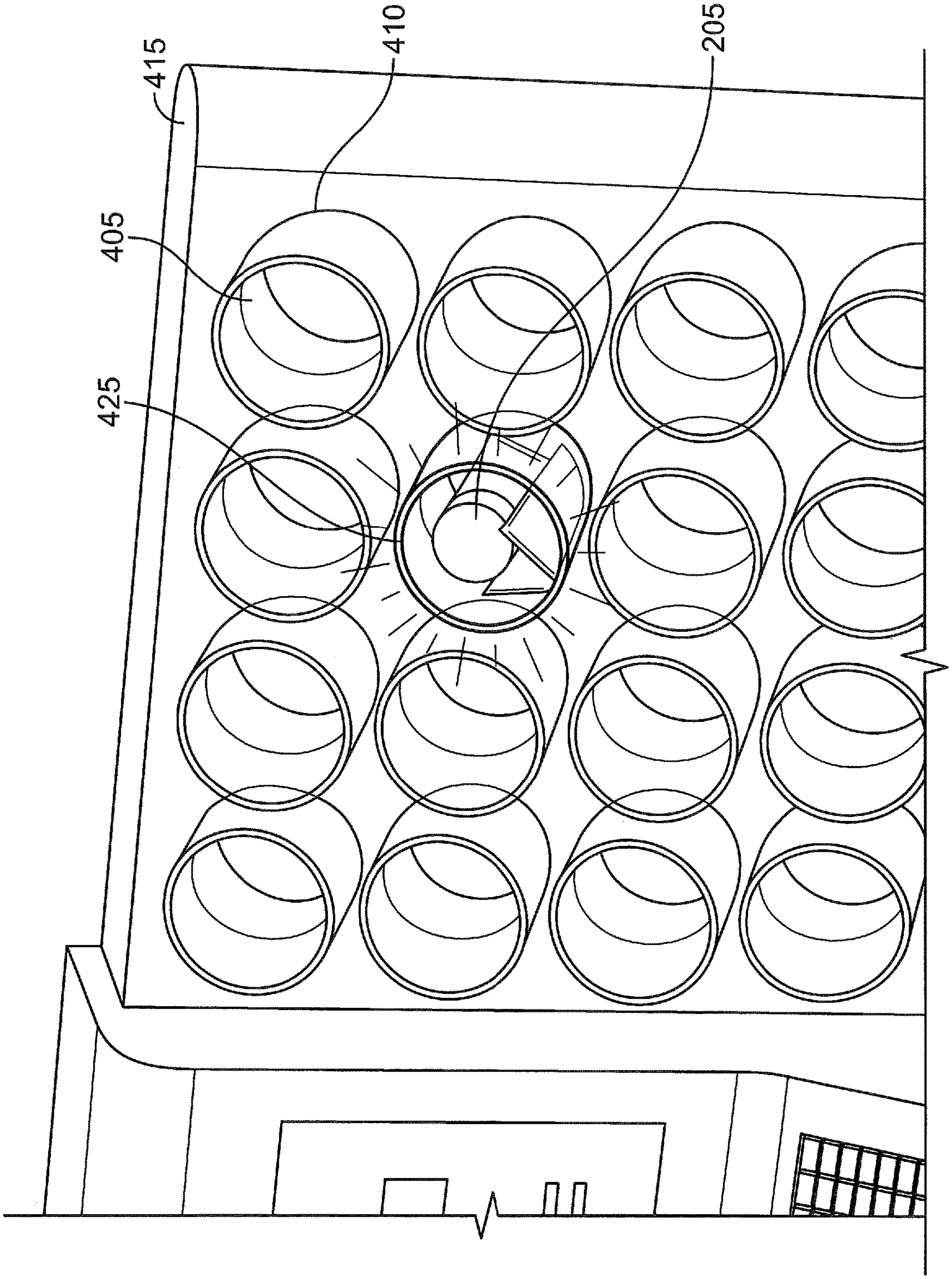
FIG. 9 is an enlarged view of the slotted tubes from FIG. 7 or FIG. 8.

In FIGS. 7-9, a system 400 is shown that includes the same components and functionality as the previous embodiments, except the receptacles are replaced with opened drawer structures 405 that are secured into openings 410 on the side storage areas 415. The ends 420 of the tubes would include an LED indicator 425 controlled by the system 220.

The present embodiment has one or more of the following benefits over prior art systems: it eliminates mixing or blending errors; the system ensures accuracy; the simple, manual-controlled process produces perfect results regardless of operator's skill level or experience; the system maintains customer histories, so customer formulations can be precisely repeated time after time; using the system, even custom formulations are recorded for future reference; the system makes control independent of the operator, so should a colorist leave a salon, the exact color can be recreated; giving the salon greater control over customer retention or individual requests; the scale coupled with the control software can correct for over-dispensed ingredients, preventing wasted materials and off-shades; the system is compatible with current manufacturing processes and product packaging; the system brings tidiness and organization to an otherwise very messy process and would save counter space; and the control software can track material usage to help eliminate shrinkage, provide easier management reports, estimate future ingredient or inventory needs, and secure the materials and/or discourage employee theft.

Figure 11:
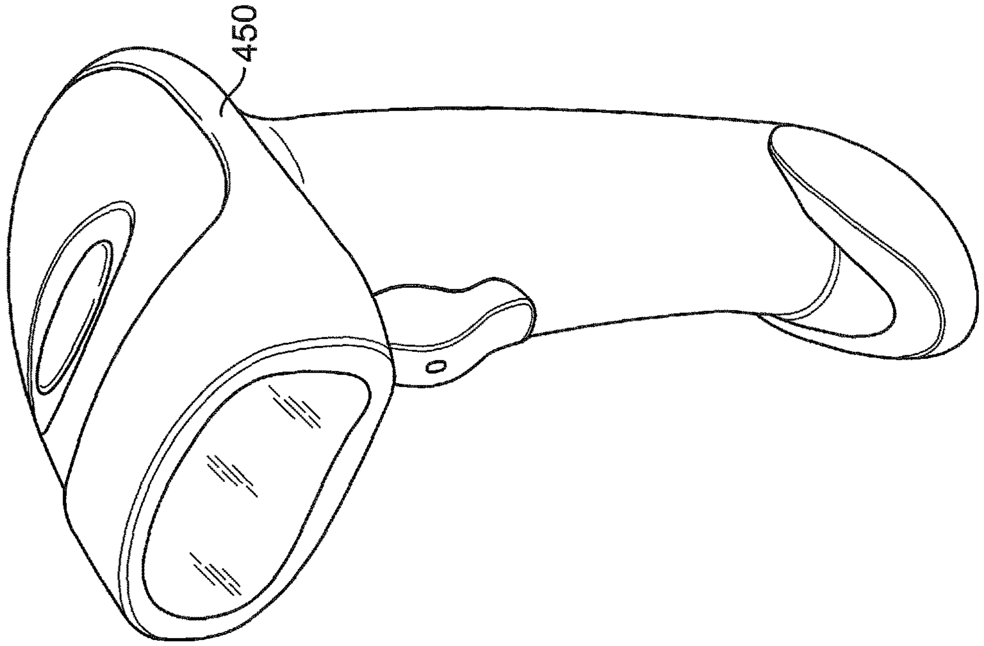
FIG. 11 is a perspective view of a bar code scanner used in one or more of the system embodiments.
Figure 10:
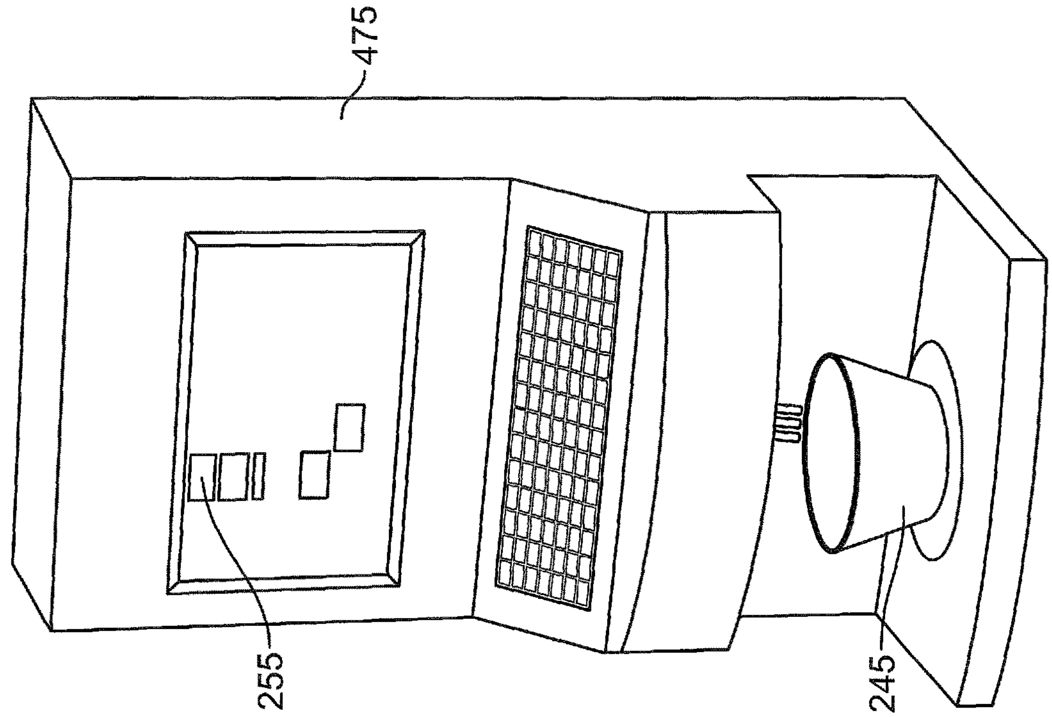
FIG. 10 is a perspective view of one embodiment of the system designed to control a process for mixing components.
Figure 12:
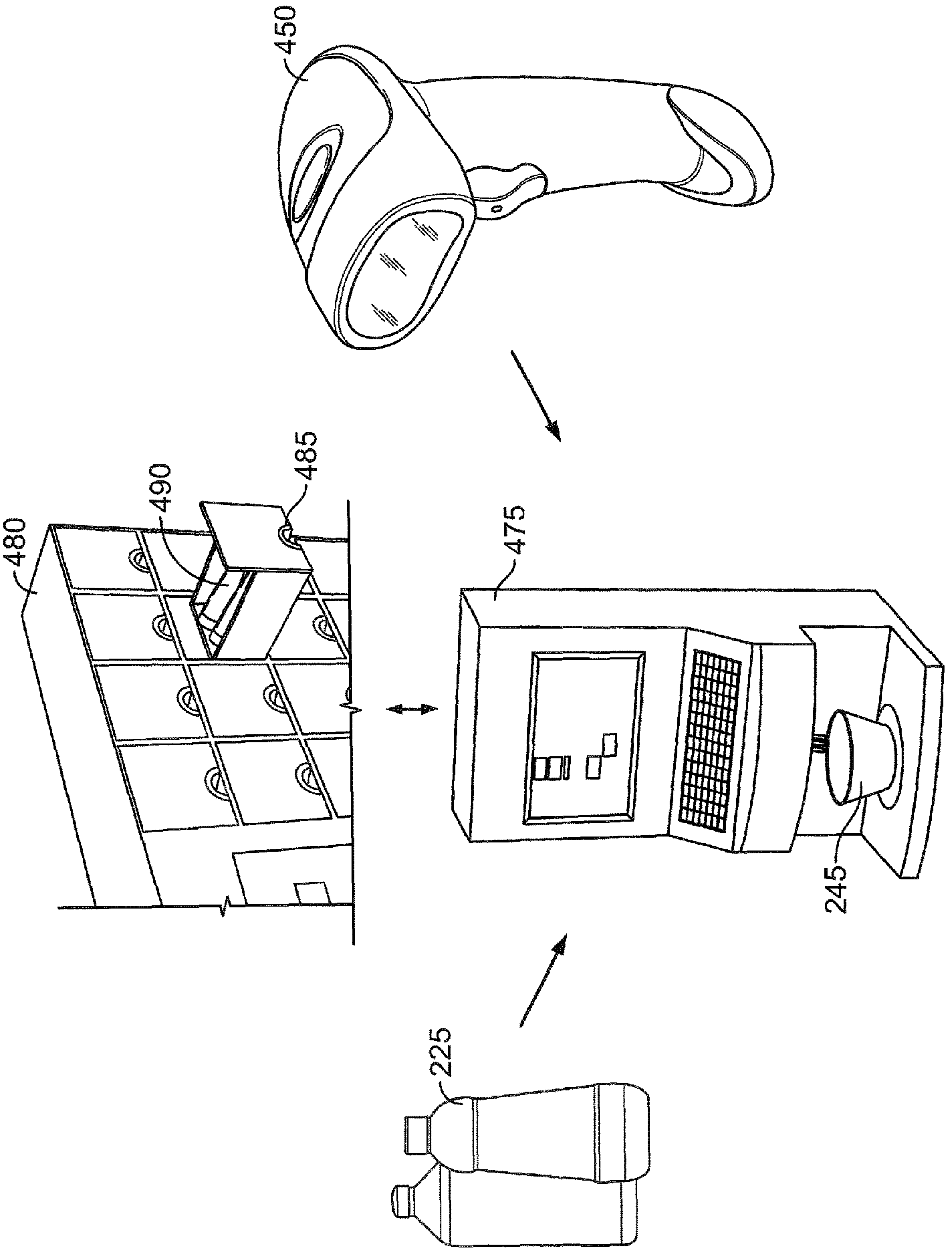
FIG. 12 is a perspective view of one embodiment of the system designed to control a process for mixing components, illustrating a modular system with at least detached storage receptacles.

Referring now to FIGS. 10 through 12, in another aspect of the present disclosure, the system would control a display to indicate a remaining weight required during the dispensing of the component. As the component is being added to the bowl 245, the display 255 indicates how much of the component remains to be added, by counting up or down to the target weight. Various kinds of analog indicators (discussed in greater detail below) can be displayed to more effectively communicate the remaining material to be added. When the operator presses "next" on the system, the system would illuminate the next LED (and/or opens the next drawer) and also recalibrate the scale to zero and indicate to the operator how much of the next component needs to be added. Again, as the operator adds the next component, the system leads the operator through the blending process.

An optional barcode scanner 450 could be provided to verify the correct component SKU prior to use and to facilitate inventory control. The bar code scanner may also help keep track of the product and make sure the operator is using the correct product. For example, if the system identifies a particular product in a particular receptacle, the operator after retrieving the product would scan the product. The system would check to make sure the actual product scanned is the correct product identified by the system for use. Other types of scanning equipment may be employed such as RFID scanners.

In other aspects, the system 475 may have separate receptacle storage areas 480, shown in FIG. 12, as a more modular system setup. The separate storage areas 480 and the main console area 475 would communicate either wirelessly or through wired connections. This would allow one or more consoles 475 to communicate and direct the receptacle storage areas 480 to turn on and off the LED or other indicators 485, in order to illustrate which receptacle to retrieve the required components 490; and keep track of the quantities of components for re-ordering purposes. In addition, it would thus be possible to just use a console without the storage receptacles.

In another embodiment of the present disclosure, the system 100 may be used in conjunction with management software. The elements of a basic management package would be shared by the system application including the ability to access and share customer data, customer history, inventory data, and provide usage reports by stylist, customer, salon, store. This could be a separate solution linked to the present disclosure or completely integrated therewith as a single system.

The management software packages maintain basic customer data such as name, telephone number, email address, and the like. History data would include service date, services provided, user, notes and perhaps photographs. The system may be able to maintain a separate dispense history file, but will be capable of sharing this information with the management software packages for inclusion with customer history records. In addition, the management software packages may have inventory modules, product usage would need to be reported.

Figure 13:
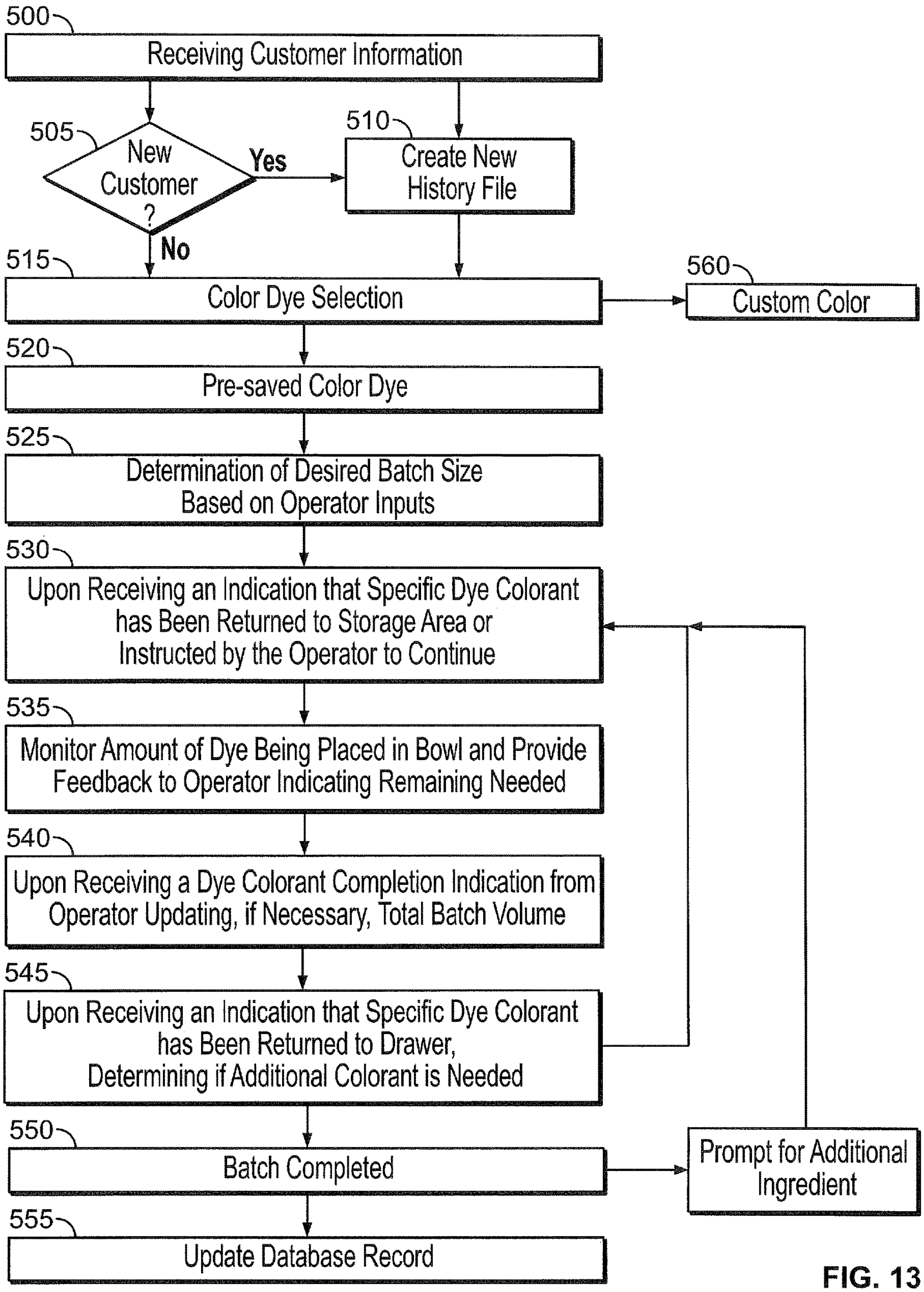
FIG. 13 is a block diagram illustrating the creation of a new hair dye formula.
Figure 14:
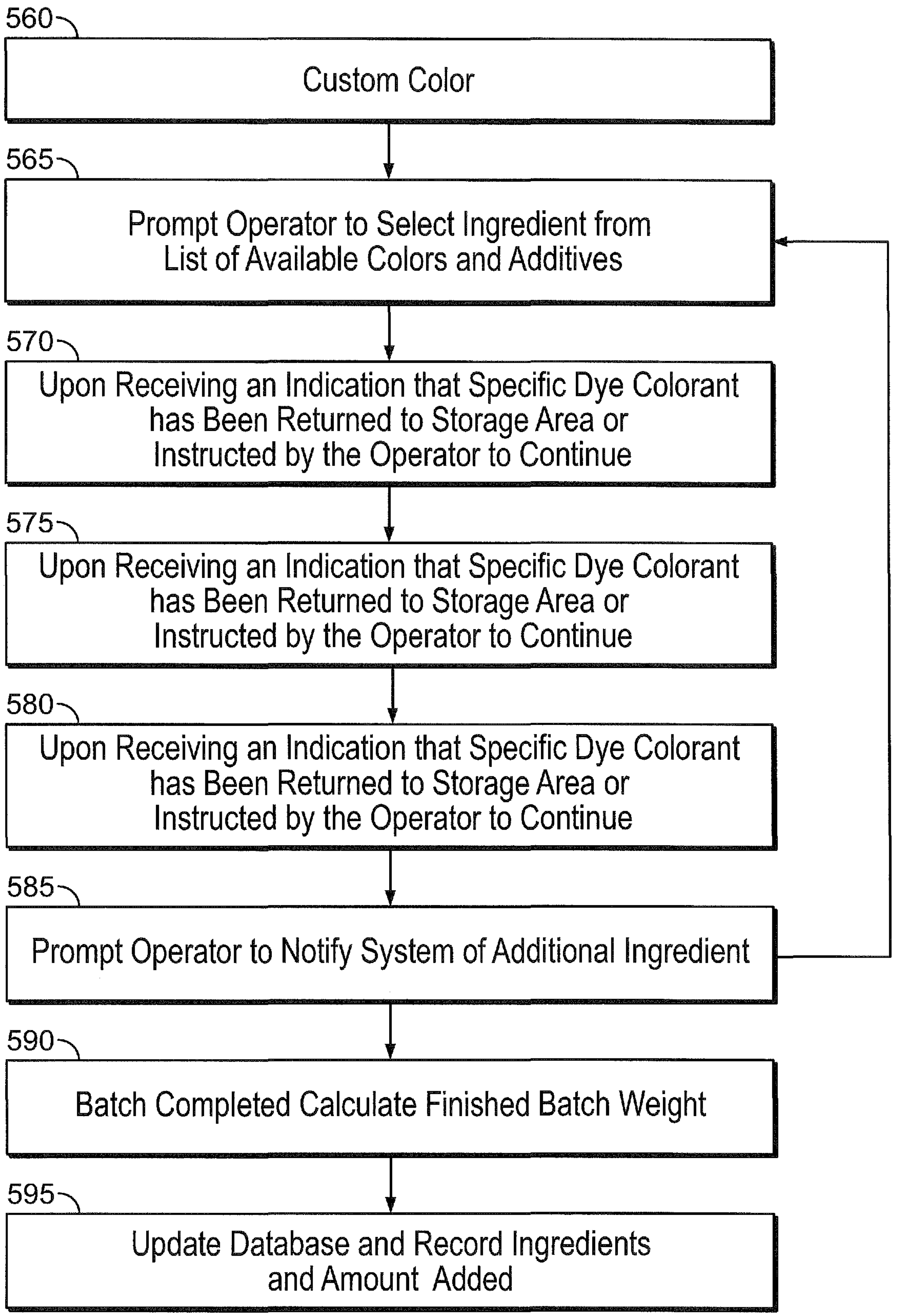
FIG. 14 is a block diagram illustrating the creation of a custom color.

Referring now generally to FIGS. 13 and 14, one or more of the present embodiments will be referenced in the given flow diagrams to illustrate various inputs and outputs from a given system, and includes the use of a blending control software as described below.

In use with one or more of the present embodiments and an available management software, operation of the system could typically follow in the following steps:

(a) an operator may need to identify or log onto the system and then the operator enters the customer name or other identifying characteristic (i.e., telephone number, and the like) into the blending control software, BOX 500;

(b) the blending control software would act to control and display the customer's history information; however, if this is a new customer (BOX 505), the blending control software would permit the operator to create a new history file (BOX 510);

(c) the operator then selects desired components, BOX 515, from an available chart or pallet which is stored within a formulation database (BOX 520) (if the management software package has a chart or pallet database, the blending control software would be linked to it or in communication therewith so the chart or pallet could be read and interpreted by the blending control software;

(d) the blending control software then prompts for the required amount or size of finished component;

(e) the blending control software may then prompt for an activator strength;

(f) the stock color recipe is mathematically scaled for the desired batch size and the selected activator strength is displayed, BOX 525;

(g) the operator is prompted to place an empty mixing bowl on the scale.

The blending control software will compare actual weight of the bowl against a target range value—this range of values is to be user definable. If the set range is 0 to 0, the no validation will occur. The blending control software will contain a maximum weight for the mixing bowl to allow sufficient fluid capacity and stay below the maximum scale capacity. For example, if the maximum scale capacity is 1,200 grams, and the batch size calls for 600 grams of dye components, then the maximum possible weight of the mixing bowl would be 600 grams. However, to allow for batch correction capability, the calculation should assume a 50% dye component weight variation (i.e., of 600 grams, plus variation=900 grams leaving a maximum bowl weight of 300 grams). Enforcing a maximum bowl value ensures sufficient scale capacity for color mixing. Alternatively, the operator may simply be able to zero out the weight to ensure the system and scale are ready to continue.

(h) If the correct bowl weight value is achieved or the weight is zeroed out, the blending control software will prompt for the first component, BOX 530;

if the bowl is above the maximum allowable, a caution message should be displayed;

(i) as the first component is prompted, an LED or other indicator adjacent to the corresponding receptacle is activated so the operator can quickly locate the desired ingredient (for systems with optional storage system);

(j) if storage locks have been included, an unlocking signal is provided to a corresponding solenoid. For reference, this optional feature would only allow receptacles which were un-locked by the blending control software to be opened. This provides two features: (a) prevent inventory theft and/or (b) force the operator to use the system-operators cannot get inventory otherwise. This ensures that all transactions are recorded and properly accounted for in the system's history files. Similarly, the blending control software could actually open and or close the receptacles; or lock and unlock the receptacles with appropriate hardware and mechanics, all of which are well known;

(k) as noted above either the weight of the mixing bowl is internally recorded for use in measurement calculation or scale is zeroed out; a digital value of 0.0 grams is displayed to help the user begin adding the first ingredient;

(l) the operator adds the amount indicated on the display panel, while the scale monitors exactly how much has been added and provides user feedback via the analog and/or digital indicators, BOX 535;

(m) a color-coded analog bar-graph scale (or as noted below—other types of analog or non-digital displays or sounds can be used) is displayed that shows the progress of the first component being added. If an analog scale is used, then, as material is added, the analog bar-graph scale changes color from green to yellow, to orange and finally to red. Green being the starting point, yellow to indicate the operator is nearing the target weight, orange is very close, and red meaning stop; If other indicators are used the display or sounds will change accordingly;

(n) the blending control software will compare the actual dispensed amount to establish accuracy standards. When the calculated range of a sufficient amount of an ingredient has been reached, the ingredient will be considered complete and the display will turn red. If the volume added is greater than the maximum allowed value; the user will be prompted to "accept," or "correct" the batch. If "correct" is selected, the total batch volume will be recalculated based on the amount of the discrepancy, BOX 540. All corresponding weights will be increased accordingly. If other ingredients had been added to the batch prior to the over-dispense, the blending control software will automatically prompt the operator to add additional amounts of these ingredients as required. When the correct add has been completed, the operator is prompted to return the component to the storage receptacle/drawer (if applicable) and to close the receptacle in order to continue;

(o) the blending control software would then prompt the operator to the next component by illuminating the LED adjacent to the corresponding receptacle. Similarly, if door locks have been included, an unlocking signal is provided to the corresponding solenoid;

(p) the current weight of the mixing bowl is internally recorded for use in measurement calculation and then zeroed out with a digital value of 0.0 grams being displayed to indicate that the blending control software is ready for the next ingredient. The operator repeats steps (l) through (n) for all weighed ingredients (BOX 545);

(q) if the blending control software is equipped with "automatic additive dispensing," the blending control software will automatically dispense the desired activator or base ingredients. The dispensing function is performed gravimetrically (using the scale). If more than one ingredient is to be added, they will be dispensed sequentially. Without automatic dispensing, the blending control software would simply prompt the user to add the appropriate activator or base ingredient and indicate the required amount as indicated for other ingredients in the previous steps;

(r) when all ingredients have been added, the operator will be prompted to remove the mixing bowl (Box 550); a database record is created with the precise amount of each ingredient dispensed and the record is stored in the history file (Box 555). A record containing the color name, amount, time and date is created and can be passed to the salon management software package and the salon management software package is then able to attach the information as a note to the custom record file;

(s) in addition, a record of the amount of each ingredient used will be maintained in the blending control software for inventory tracking purposes. The operator will have the ability to query the blending control software to determine the amount of each ingredient for a given time period. The blending control software should also be capable of passing usage values to the salon management software package if necessary;

In instances where the operator would be creating a new mixture for a customer (FIG. 14), the operator would have the option to create a new file (BOX 560), which would be selected to start the appropriate software section of the blending control software. The operation would follow similar steps to the above, except instead of notifying the operator which component to use, the blending control software would prompt the operator to select the first ingredient to dispense from an on-screen list of available components, such as listing available colors and/or additives (BOX 565). After the selection is made, an LED or other indicator adjacent to the corresponding receptacle is illuminated to provide the operator with an identification of where the component can be located (BOX 570). If door locks have been included, an unlocking signal is provided to the corresponding solenoid, after which locking signals, and even, if desired, opening and closing signals, could be easily added.

The tare weight of the mixing bowl is internally recorded for use in measurement calculation, and a digital value of 0.0 grams is displayed with the bowl on the scale to indicate the blending control software is ready for an ingredient to be added. The operator adds the desired amount of the first ingredient, while the corresponding reference weight is displayed (BOX 575). When the addition is complete, the user selects "next". The operator is prompted to return the component to the storage receptacle (if applicable) and to "Press any key to Continue." (BOX 580). If door locks are used, the blending control software may automatically lock the receptacle when the component is returned and the receptacle closed by the operator or it may be automatically closed by the blending control software after the component is returned and the operator indicates that they would want to proceed. The display would show the name of the first ingredient, and the amount added to the formula. The operator is prompted to select the second ingredient from an on-screen list (BOX 585). If door locks have been included, an unlocking signal is provided to the corresponding solenoid. The tare weight of the mixing bowl is internally recorded for use in measurement calculation, and then zeroed out with a digital value of 0.0 grams displayed so the operator can add the next ingredient. The operator adds the desired amount of the second ingredient, while the corresponding reference weight is displayed. When the addition is complete, the user selects "next." The display shows the names of the first two ingredients, and the amount of each added to the formula. This would continue until all of the required ingredients have been added. When the last ingredient has been added, the operator selects "done" (BOX 590). Upon completion, a total batch volume will be calculated based on the specific gravity of the individual ingredients. This value is stored for future reference to permit batch size scaling of the recipe. A database record is created with the precise amount and optimum target amount of each ingredient dispensed and is stored in the history file within the blending control software (BOX 595). A text record containing the name, amount, time and date is created and passed to the management software package to be attached as a note to the custom record file. A record of the amount of each ingredient used will be maintained in the blending control software for inventory tracking purposes. A simple query should be available to determine the amount of each ingredient for a given time period.

In addition, raw material inventory management functionality with and without the use of optional barcode equipment may be provided by one or more of the present embodiments. Barcode scanning devices simplify inventory management functions. By using an attached barcode scanner, mixing ingredients can be easily identified for inventory tracking purposes. The functions could be two-fold. One, an on-hand salon inventory could be established by scanning all available product inventory items. When new shipments are received, they too could be scanned, thereby easily adding them to the on-hand inventory. Secondly, when blending control software is equipped with the optional storage receptacles, scanning the component could also be used to illuminate the appropriate lamp, or unlock the corresponding door. This functionality will help to ensure that the materials are properly stored and further minimizes the potential for selecting the wrong material during subsequent mixing operations.

In the case of a salon, the blending control software may also track use of the system by the operator(s), which allows cost reporting by employee. It would also accurately track third-party billing for "chair rental" environments. In many salons, some of the stylists are not employees, but rather rent a chair from the salon owner. Sometimes a stylist renting a chair provides their own materials, such as hair color, and some utilize materials from the salon. Since the blending control software would know the exact amount of each ingredient included in a blend, it has the ability to establish the exact material cost for each batch. This data can be used to better understand service costs and can also be used to provide billing data for "rental chair" staff.

In additional embodiments, the blending control software can be provided with the ability to help eliminate waste. In salons, the user or stylists typically mix more than the required amount of components for their clients. The reasons are twofold: (a) current volumetric measurement systems do not allow for scaled down batches, and (b) it is difficult to estimate the actual amount of components or color required and they do not want to run out mid-application. One improved feature would allow the user or stylist to return the mixing bowl to the scale after finishing with the client. Since the weight of the bowl at the end of the mixing step was known when the mixture was produced, the blending control software can subtract the returned bowl weight from the final weight. It is then possible for the blending control software to know the amount of mixture actually used by the user or stylist during application. The client's master formula can then be adjusted to the actual amount used and if necessary an additional amount can be added for a defined safely factor, such as 5% or 10%. On subsequent client visits, the re-scaled master formula, combined with the precision measurement capabilities of the blending control software, virtually eliminates product waste.

In one embodiment, there is provided a system for recalculating a formula previously used in preparing a mixture made from adding at least two components. The system includes a control apparatus and a scale. The control apparatus has a memory (permanent and/or temporary), input controls, and a display. The memory is used to store a mixture formulated from mixing at least two components. The scale is in communication with the control apparatus. The control apparatus monitors a weight on the scale, such that a final weight of the mixture previously prepared from mixing at least two components is stored on the memory. In this embodiment, when an end weight of the mixture, defined to be the final weight of the mixture previously prepared minus an amount used by a user, is positioned on the scale and when the control apparatus receives a recalculation signal, a blending control software calculates the amount used, recalculates the mixture based on the amount used, and stores a new mixture for subsequent use. This helps reduce and eliminate extra waste.

This system embodiment can further be defined as a method for recalculating a formula. The method would provide a first step of providing a control apparatus having at least a memory, input controls, and a display, wherein the memory stores a mixture formulated from mixing at least two components. The next step would be providing a scale in communication with the control apparatus, such that the method stores on the memory a final weight of a mixture previously prepared from mixing at least two components. After use, the user would weigh on the scale an end weight of the mixture. The end weight of the mixture defined as the final weight of the mixture previously prepared minus an amount used by a user. Finally, the method recalculates the formula of the mixture based on the end weight of the mixture against the final weight of the mixture and stores the recalculated formula on the memory of the control apparatus.

In an additional embodiment, there is provided a system for preparing a mixture. The system includes a control apparatus having at least a memory, input controls, and a display. The memory has the capacity to store at least one mixture formulated from mixing of one or more components based on recommended formulated amounts of the one or more components. In communication with the control apparatus is a scale monitored by the control apparatus for changes of a weight on the scale. The control apparatus, upon receiving an input for a creation of a mixture, will display a formulation of the mixture indicating the component(s) and amount(s) needed to create the mixture, and the control apparatus will further monitor changes in the weight of the scale. The control apparatus will adjust the formulation when a weight of a component added to the mixture is different than the recommended formulated amount.

In yet another embodiment of the present disclosure there is provided a system for the storage and for the mixing of ingredient components to provide an operator the ability to create a mixture. The system is defined to include a plurality of storage receptacles, each receptacle holding at least one component and each receptacle in communication with a control apparatus. The control apparatus has at least a memory, input controls, and a display. The system improvement includes: (a) the memory having the capacity to store and/or storing at least one formulated mixture, which lists the component(s) and amount(s) thereof; (b) the control apparatus upon receiving an input for a creation of a mixture displays the formulated mixture indicating the component(s) and amount(s) needed to create the mixture; and (c) an electronic locking mechanism positioned at each storage receptacle, wherein the control apparatus upon receiving the input for the creation of the mixture is capable of sending a signal to the electronic locking mechanism to lock and/or unlock one or more receptacles relative to the component(s) being held therein to create the mixture.

Alternatively, each receptacle may have an opening position and a closing position. In these instances, each receptacle having the electronic mechanism positioned at each storage receptacle is set to open and/or close the storage receptacles. Therefore when the control apparatus receives the input for the creation of the mixture it is capable of sending a signal to the electronic locking mechanism to open and/or close one or more receptacles relative to the component(s) being held therein to create the mixture.

Figure 15:
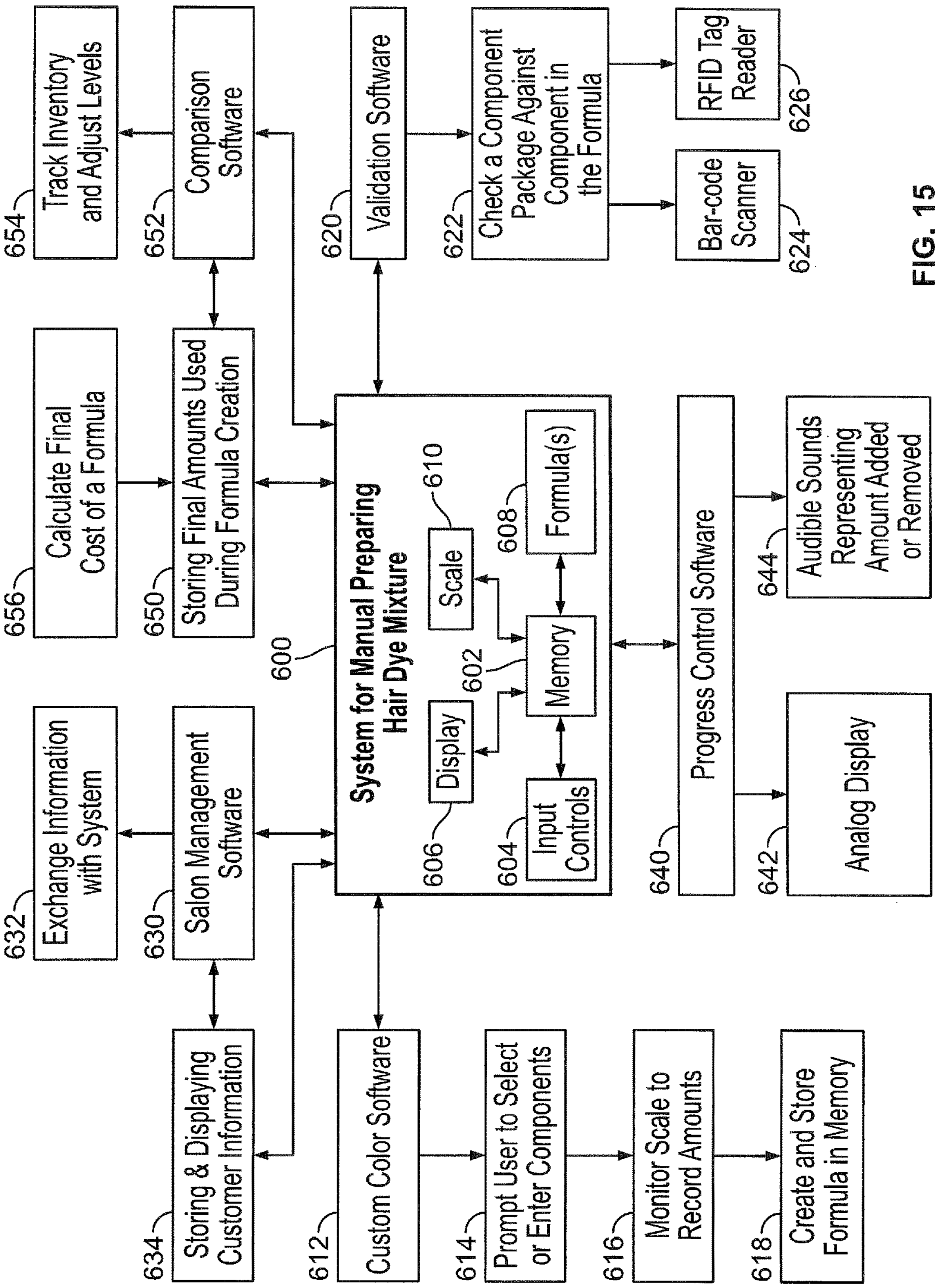
FIG. 15 is a system illustration showing various software components and their relationship to the system.

Referring now to FIG. 15, there is provided in various embodiments a blending control system 600 for preparing a hair dye mixture. The blending control system generally includes a control system having one or more of the following elements: (a) a memory 602, (b) input controls 604, and/or (c) a display 606. The blending control system further includes at least one formula 608 stored in the memory 602. The formula defines instructions of one or more colorants and/or dye blending materials and amounts recommended for recreating a hair dye mixture. The blending control system also includes a scale 610 in communication (wireless or wired) with the blending control system.

The blending control system in a first aspect of the various embodiments includes custom color software 612 to permit the user to create a custom color. The custom color software 612 upon receiving a manual input from the input control for a creation of a hair dye custom color mixture, will prompt a user to select or enter one or more colorants and/or dye blending materials 614, and monitors the scale for an amount corresponding to said one or more colorants and/or dye blending materials 616. The custom color software will create and store 618 a hair dye mixture formula based upon the selected or entered colorants and/or dye blending materials and the corresponding amounts that were placed on the scale. Various other aspects and uses of the custom color can be incorporated with the formula adjusting software used to adjust the formula of the hair dye mixture when a weight of a colorant or dye blending material being added to the scale is different than the amount recommended in the formula.

In a second aspect of the various embodiments, the blending control system includes validation software 620 to check a hair dye component package against the hair dye component(s) in the formula to ensure and validate a user is accurately recreating the hair dye mixture 622. The validation software may be used in connection with a bar-code scanner 624 to scan the bar codes positioned on the component package or used in connection with an RFID reader 626 to read information for an RFID tag positioned on the component package.

In a third aspect of the various embodiments, the blending control system includes salon management software 630 in communication with the system to exchange information on customers and formulas of hair dye mixtures associated to said customers 632. In this aspect the blending control system could have the input control and the display in communication with the blending control system and software for displaying the instructions on said display in response to a manual input from the input controls and monitoring software to monitor a weight on the scale 634. The monitoring software aids in monitoring changes in the weight on the scale such that the blending control system is able to calculate a difference between a recommended formulated amount of a colorant or dye blending material and an actual amount of the colorant or dye blending material added to the scale. This difference can then be measured down to a zeroed amount, with an adjustment for the weight of a receptacle, such that the blending control system is able to indicate how much additional colorant or dye blending material is needed to be added to the scale to reach the recommended formulated amount of the colorant.

In a fourth aspect of the various embodiments, a blending control system includes progress control software 640 to indicate how much of one or more of the colorant(s) and/or dye blending material(s) from the hair dye mixture may be added to or removed from the scale. The progress control software can include an analog or non-digital display representation 642 of one or more of the colorant(s) and/or dye blending material(s) from the hair dye mixture, and the software capable of changing the representation to indicate an amount being added to or removed from the scale. The representation can be a graph, such as a bar-graph, circular, pictorial, or line graph and can be color-coded or black/white, or gradation; alternatively it could use sound or other types of representations. The process control software can also include the ability to replay audible sounds 644 or lights representing the amount dispensed of one or more of the colorant(s) and/or dye blending material(s) from the hair dye mixture, and includes software to replay audible sounds or lights to indicate an amount being added to or removed from the scale.

In a fifth aspect of the various embodiments, the blending control system includes at least one set of customer information stored in said memory, such that the customer information 634 is associated with the at least one formula. The blending control system further includes software to update at least one set of customer information. And the blending control system can be linked to the salon management software to exchange customer information.

In a sixth aspect of the various embodiments, the blending control system includes software to store in the memory a final amount used of each of the one or more colorants and/or dye blending materials defined by the formula 650. In this aspect the blending control system may further include comparison software 652 to track the inventory 654 of the one or more colorants and/or dye blending materials by reducing a current inventory level of each of the one or more colorants and/or dye blending materials by the final amount used of each of the one or more colorants and/or dye blending materials. In addition, the comparison software used to track inventory levels and reduce the current inventory level by an amount used during the preparation of a hair dye mixture and/or increase the current inventory level by an amount received during a new shipment or returns of unused ingredients. Yet still, the amount reduced can further be allowed to track if a product is thrown out, spoiled, missing or otherwise needs to be reduced to ensure proper inventory levels. Yet as a further consideration, the amount used during the preparation of the hair dye mixture is determined by the amount on the scale. This could also be used to compare different stylist's, store's, or manufacturer's performances.

In a seventh aspect of the various embodiments, the blending control system has stored in said memory current inventory levels for at least one or more colorants and/or dye blending materials and the costs associated with each one or more colorants and/or dye blending materials. The blending control system further includes software to calculate the final cost 656 of a hair dye mixture by monitoring the preparation of the hair dye mixture including monitoring the scale for a final amount used of each of the colorants and/or dye blending materials defined by the formula, allocate a cost of each used during the preparation and calculate the final cost by adding the individual costs. Once a final usage and/or cost is determined, color usage and/or cost can be reported by a reporting software. The reporting software will further be capable of creating reports for specified time periods on the material usage and cost based by stylist, client, salon or region (when the software are linked to other salons), manufacturer of a particular product or by product line, and/or chair or booth renter. The reporting software will further include components for determining average costs per client per treatment and other operating data.

Figure 16:
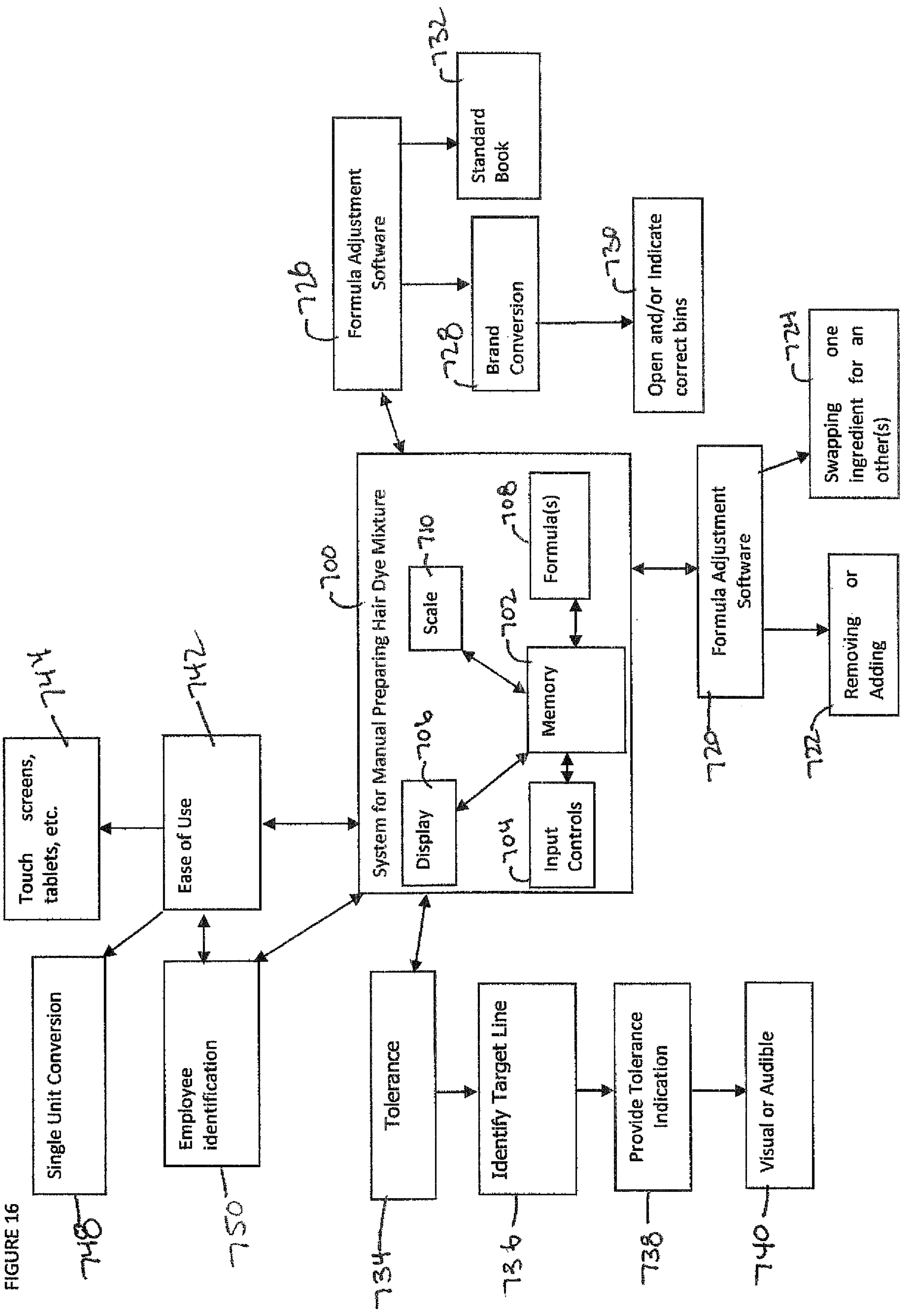
FIG. 16 is a system illustration showing various software components and their relationship to the system.
Figure 17:
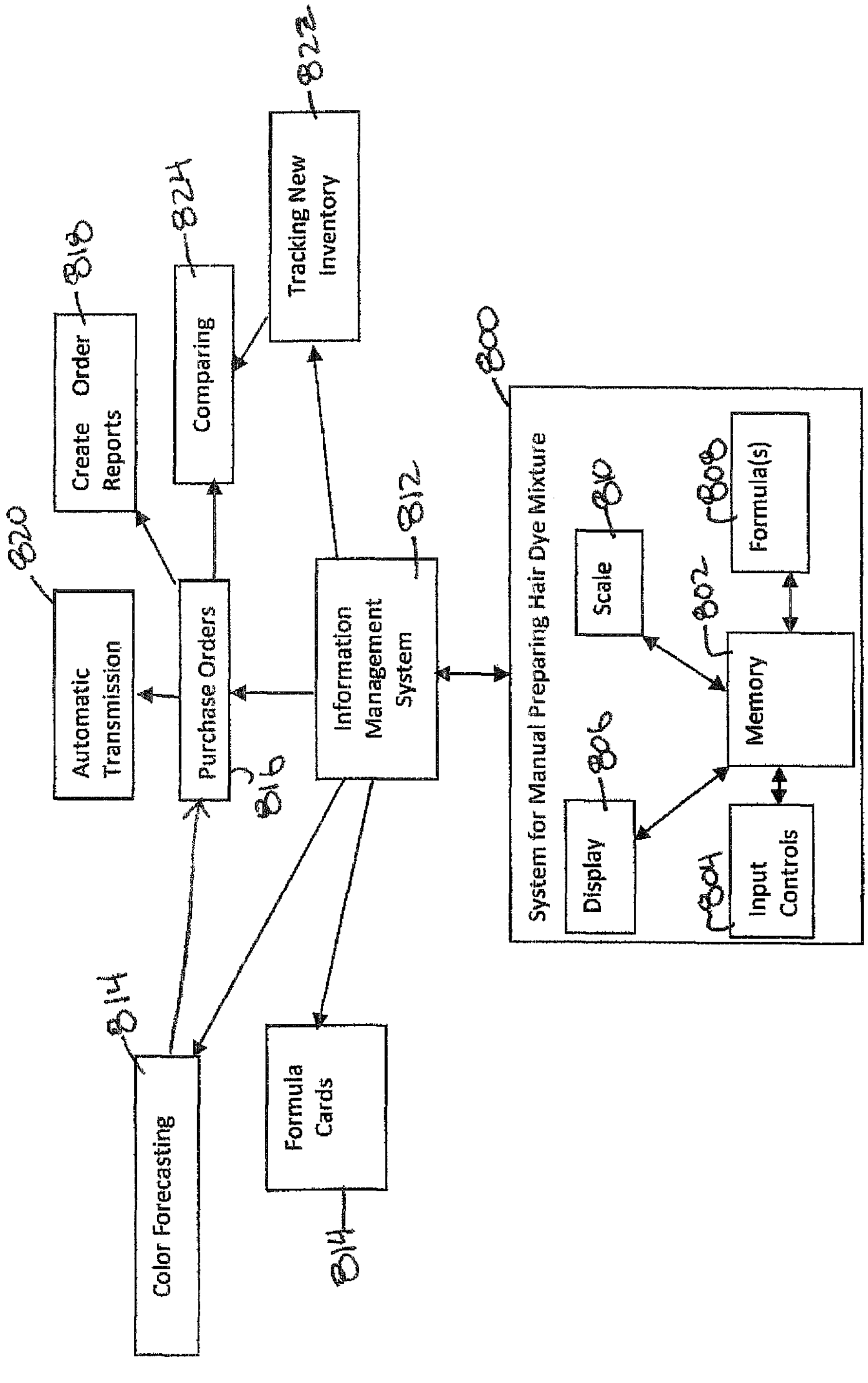
FIG. 17 is a system illustration showing various software components and their relationship to the system.

Referring now to FIG. 16, there is provided in various embodiments a blending control system 700 for preparing a hair dye mixture. The system generally includes one or more of the following elements: (a) a memory 702, (b) input controls 704, and/or (c) a display 706. The system further includes at least one formula 708 stored in the memory 702. The formula defines instructions of one or more colorants and/or dye blending materials and amounts recommended for recreating a hair dye mixture. The system also includes a scale 710 in communication (wireless or wired) with the system.

The system in an eighth aspect of the various embodiments includes software that permits for formula blending and adjustments. As mentioned above, this could include reformulating a formula based on changing a particular quantity of an ingredient such as adjusting for adding too much or not enough of an ingredient. Separately, this could also include the ability to add or remove a particular ingredient from a formula, or swap or change a particular ingredient with another component. A formula adjustment software 720 would receive an indication from the input control that either an additional ingredient is being added or an ingredient from the formula is being removed 722. The formula adjustment software 720 will then adjust the final total and/or in some circumstances may recalculate the formula to adjust for the increased batch size or strength of the mixture. The user would then not be required to start over with a new customer mixture. In another aspect, a particular ingredient may need to be changed or swapped out for a different ingredient 724. Changing a particular ingredient may be done because the particular ingredient is missing from inventory. For example, if a shade of red is out of stock the stylist may know that they can combine certain other colors for the desired effect. The formula adjustment software will adjust the final total and/or in some circumstances may recalculate the other components of the formula to adjust for the increased batch size or strength of the mixture.

In other aspects, the formula adjustment software 726 can be capable of converting a particular formula from one brand of product to another brand 728. For example, if a particular mixture of colors in one brand needs to be duplicated for a different brand, the particular ingredients may be different. A formula brand conversion would permit the operator to recreate the mixture using different branded products. If provided with the system, once converted, the system would also control the correct receptacle or drawer to unlock, open, and/or indicate (by LED or other means) 730. In another aspect, the formula adjustment software 726 may include a particular manufacturer's standard book of colored mixtures 732. This permits the user to start with a base line formula that may be adjusted and customized for a particular client.

It is further noted that the blending control system has further built-in a defined tolerance component 734 towards the target total amount needed for the particular ingredient or total mixture. When adding a particular ingredient it has been found that, within a certain small tolerance of being over or under, the target amount does not necessarily effect the end mixture. This tolerance has a tendency to be about 1-2 percent over or under the recommended value in the formulas; however it is possible that the tolerance level can be set by the salon, operator, manager, manufacturer of the product, or the like. To help a particular user identify the tolerance, the progress indicator may include a Target Line 736 to which the user may attempt to achieve for a perfect mixture but then it may further include a Tolerance Indication 738 above and below the Target Line that the user will identify as a region that, if the ingredient weight added reaches within the Tolerance Indication, the user can move on to the next ingredient without reformulating the entire mixture. The Tolerance Indication may be visual or audible 740, and if visual may be represented as lines or brackets above and below the Target Line, see also FIG. 22.

In a ninth aspect of the present embodiments, the blending control system can include various aspects to increase an operator's ease of use 742. Various technological components can be provided, such as touch screens 744 and wireless keyboards/mouse. Employee Identification systems 750 may also be used to correctly identify an employee and provide the employee with the appropriate access to the blending control system. Various employee identification systems may be used, such as but not limited to magnetic card scanners; fingerprint scanners; barcode readers; password protection. The employee identification systems can also be used in connection with the below information management systems with its layered security measures to correctly identify personnel with specific access to certain areas in the blending control system.

Other aspects of the system's ease of use include an ability to automatically convert a product packaging unit of measurement to a single system of measurement 748. Various packages may have volume and weight in various scales. The system having the information entered into the blending control system based on the particular product will convert the unit to a single system of measurement used by the operator. The single system of measurement may be done as a weighted system. Alternatively, since the progress indicator system is provided, the indicator may itself be viewed as the single unit system. The system's ease of use can be further implemented by providing step-by-step guidance, on screen instructions, and warnings if the operator is adding too much of a particular ingredient or warnings if the operator is using the incorrect ingredient. The warnings and instructions can be augmented with the system's ability to control the opening or unlocking of a particular storage area or bin.

In a tenth aspect, the blending control system may be further provided with an information management structure 812. Various software components used to manage the information in the blending control system, which may or may not include information in the salon management system. As noted above the salon management system and the blending control system may be a single system or separate systems linked or communicated together. The blending control system 800 is generally provided for preparing a hair dye mixture. The blending control system generally includes a computer-driven system having one or more of the following elements: (a) a memory 802, (b) input controls 804, and/or (c) a display 806. The blending control system further includes at least one formula 808 stored in the memory 802. The formula defines instructions of one or more colorants and/or dye blending materials and amounts recommended for recreating a hair dye mixture. The blending control system also includes a scale 810 in communication (wireless or wired) with the system. An information management system 812 is provided and is in communication with the blending control system 800.

The information management system 812 includes one or more components either used in concert or separately. A first component of the information management system may be directed to information about the customer or client information and their associated formulation(s). The blending control system would be able to prepare a Formula Card 814 that a customer or stylist could use at another location. The Formula Card would help the second or subsequent stylist recreate the mixture at another location if for example the other location was not linked to the blending control system. A second component of the information management system 812 would include the ability to color forecast 814. Color forecasting 814 is the ability to forecast the amount of color needed in a particular period. The forecasting can be based on a number of factors such as historical color usage, scheduled appointments and the client history, and/or promotions done by a salon. The color or ingredients in the formula is forecasted by reviewing the factors and generating a report that could include purchase orders.

A third component of the information management system 812 is the ability to generate purchase orders 816. Purchase orders 816 for particular ingredients can be generated based on color usage forecasts and real-time inventory levels, which as mentioned can be monitored and tracked by other component systems. Purchase orders 816 can also be based on reorder point levels. With the purchase orders, the blending control system would be able to create open order reports 818 and transmit the orders automatically 820 to vendors via e-mail.

In a fourth component of the information management system 812, new inventory updates 822 can be obtained when a new inventory is taken and entered into the system. Entering the inventory can be done by scanning codes or entry into the blending control system. The new inventory received can also be compared 824 to the purchase orders and usage report to determine the accuracy of the orders and reports.

Figure 18:
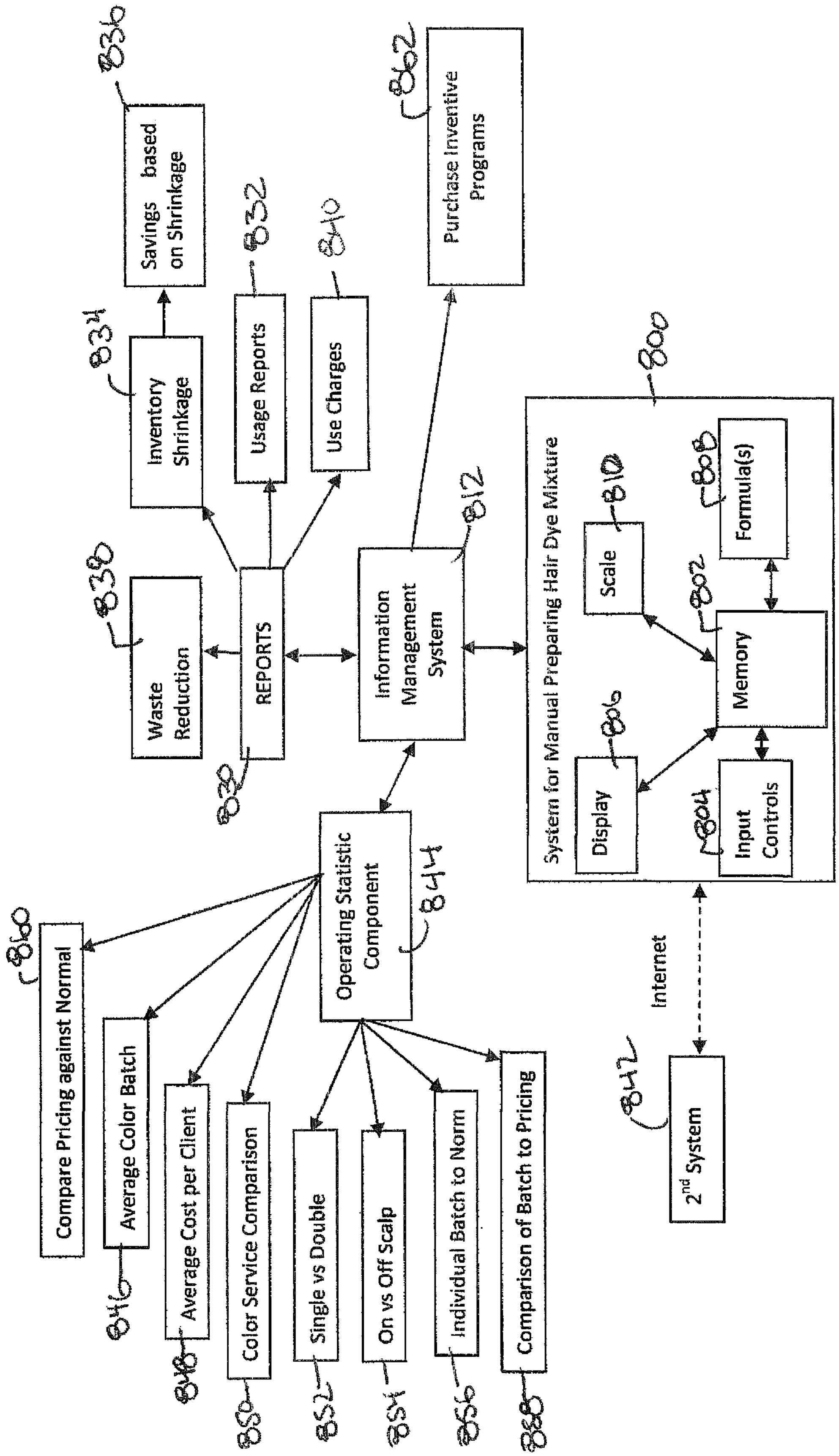
FIG. 18 is a system illustration showing various software components and their relationship to the system.

Referring now to FIG. 18, in a fifth component of the information management system 812, various Reports 830 can be generated to help the management of the system and salon(s). With detailed records on the clients and their use of the salon services, Reports showing the number or percentage of clients that use coloring services and the frequency of their use or absence can be obtained 832. Reports which show a calculation of the inventory shrinkage in concert with the physical inventory can now be obtained 834. Along with this aspect, a Report on the savings due to a reduction of inventory shrinkage for a time period can be generated 836, as well as a Report on the savings from the above noted waste reduction measure as compared to a pre-defined normal amount used for a period of time 838. Reports can also be generated to help the salon determine use charges 840, for example suggested charges can be generated for excessive amount of ingredients used, i.e., if a double or triple batch is prepared because of the length or thickness of the hair. These reports can also be exported through an intranet or internet for a manager 842 to analyze trends over a period of time. These reports can also be consolidated among multiple salons, regionally or for a nationwide report.

Along with various reports, the blending control system can also include an operating statistic component 844. The operating statistics can be based on a number of various factors either alone or in combination with each other. These factors include an average color batch by the operator/stylist 846; average cost per client 848; comparison of color services per hour, per appointment against default predetermined values 850; comparison of the number of single versus double color applications 852; comparison of the number of on-scalp or off-scalp applications 854; comparison of individual batch sizes to salon norms and flag deviations 856; comparison of batch sizes deviated to pricing surcharges 858; and comparison pricing of specific applications against normal procedures 860.

Other Reports can be based and generated to provide information on a number of salons owned by a single entity. The information can be sorted and detailed based on the aggregate of all the salons or based upon a specific city, region, or country.

Since the information management system is capable of tracking inventory, Reports can be generated to help outline the higher turn ingredients as well as show the slower-moving or dormant ingredients. Reports can also be generated to allocate usage between normative uses for a given time period and waste over the same time period.

The blending control system can further track or create purchase incentive programs 862 by monitoring products used by the stylists or the services provided by the stylist to provide a suggested recommendation of retail products purchased in the store, and then monitoring and tracking whether the purchase occurred. With full client information in the blending control system including the brand or specific ingredients used, specific promotions of retail products can be determined and recommended to the client, as well as promotions for specific salon services that are also based on specific products purchased, used, or applied.

Figure 19:
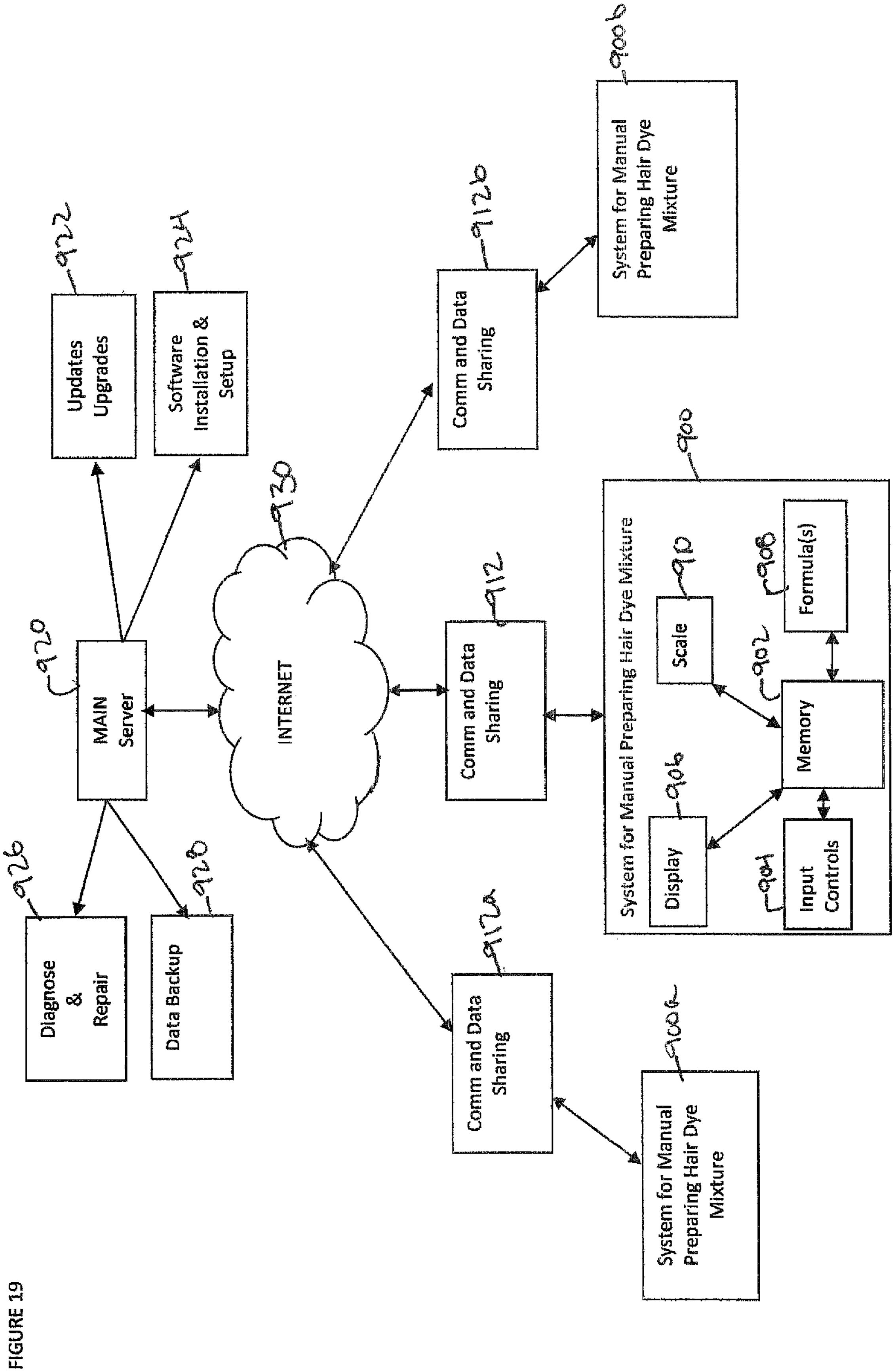
FIG. 19 is a system illustration showing various software components and their relationship to the system.

Referring now to FIG. 19, in an eleventh aspect, the blending control system may be further provided with a communication and data sharing components. Various software components used to communication and share data may or may not include information in the salon management system. The blending control system 900 is generally provided for preparing a hair dye mixture. The blending control system generally includes a computer-driven system having one or more of the following elements: (a) a memory 902, (b) input controls 904, and/or (c) a display 906. The blending control system further includes at least one formula 908 stored in the memory 902. The formula defines instructions of one or more colorants and/or dye blending materials and amounts recommended for recreating a hair dye mixture. The blending control system also includes a scale 910 in communication (wireless or wired) with the system. A communication and data sharing system 912 is provided and is in communication with the system 900.

In a first component of the communication and data sharing system 912, software would allow the blending control system 900 to communicate with a main server 920 to provide updates against a manufactured and/or installed system. Updates and upgrades 922 to the software can be done by internet login into a main server. In addition, software installation and setup 924 can also be done over the internet. The main server 920 when in communication with the blending control system 900 could help diagnose and repair 926 any maintenance issues with the blending control system, as well as provide data backup capabilities 928. If the systems are licensed for use, the main server could maintain the licenses, which if not updated and renewed could lock out the system for control by the salons.

In a second component, as mentioned above, the blending control system and the salon management system can be integrated or linked together to allow the sharing of information. The information shared between the two or more systems 900 could include data on the stylists, appointment information, point of sale service ticket information, and formula data for new and existing clients, as well as modified formula information.

If multiple systems 900*a*, 900*b*, 900*n*, are employed in a single salon or multiple salons, each system can be connected to each other to share and consolidate information. Multiple salon applications can use a local area network or a wide area network (930). The information shared can include inventory data, cost data, usage data, employee data, customer data, and formula data.

Figure 20:
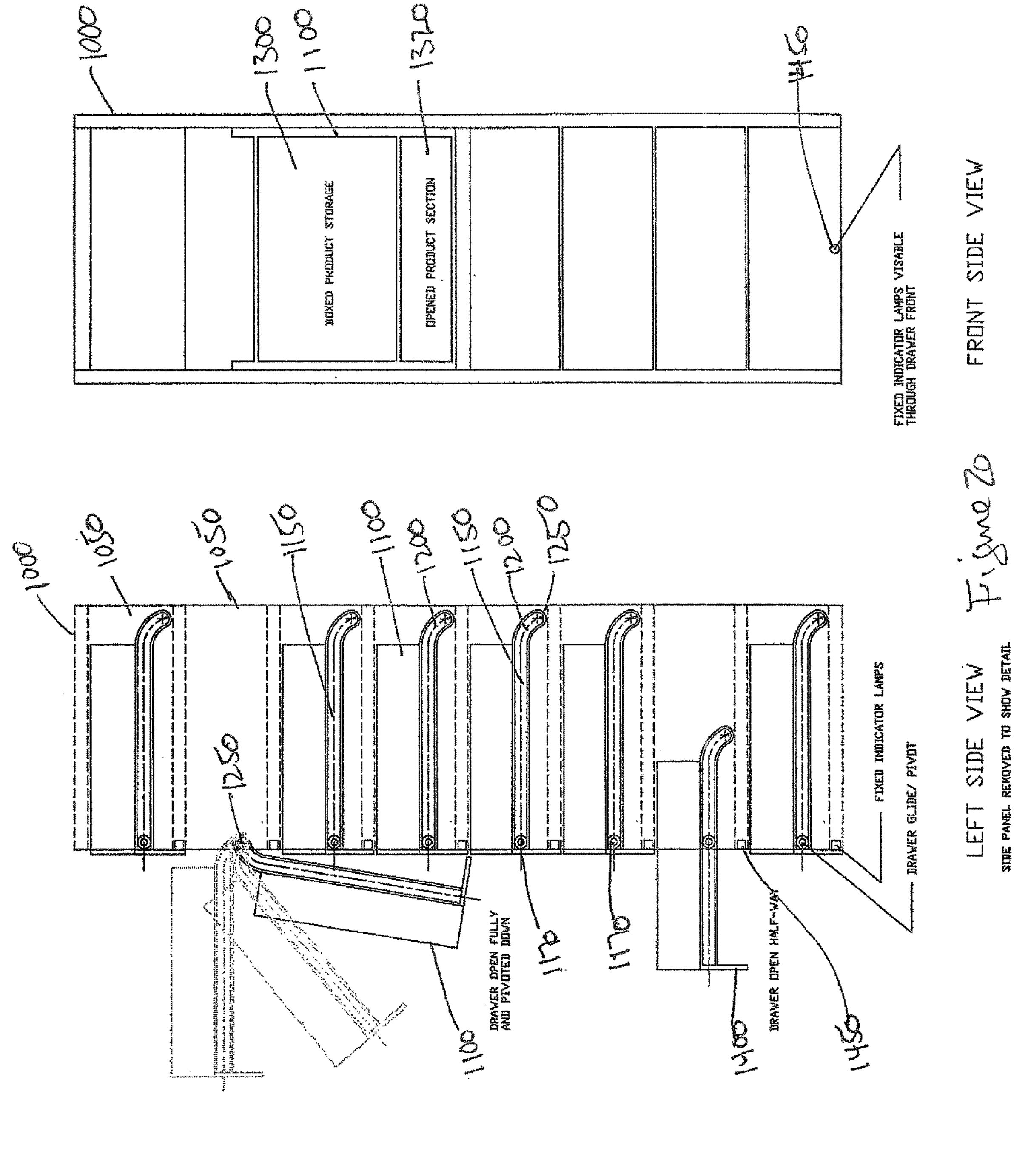
FIG. 20 is an embodiment showing a particular bin structure capable of being included in the various system embodiments.

Turning now to FIG. 20, there are shown modular shelf units 1000 which can be used in connection with a hair dye system. The modular shelf units 1000 include a plurality of shelf openings 1050 to accommodate receptacles 1100 that slide outwardly towards the user to open. The receptacles 1100 include a glide or channel 1150 that receives opposing pins 1170 that protrude from the front of the openings. The channel 1150 includes a curved section 1200 near the back region of the receptacle. The curved section 1200 curves such that an end 1250 of the channel 1150 is positioned near the back lower region of the receptacle. Thus when the receptacle is pulled out, it can swing or pivot downwardly. The drawer can have various sections 1300, 1320 to help organize and sort the product placed therein.

Figure 21:
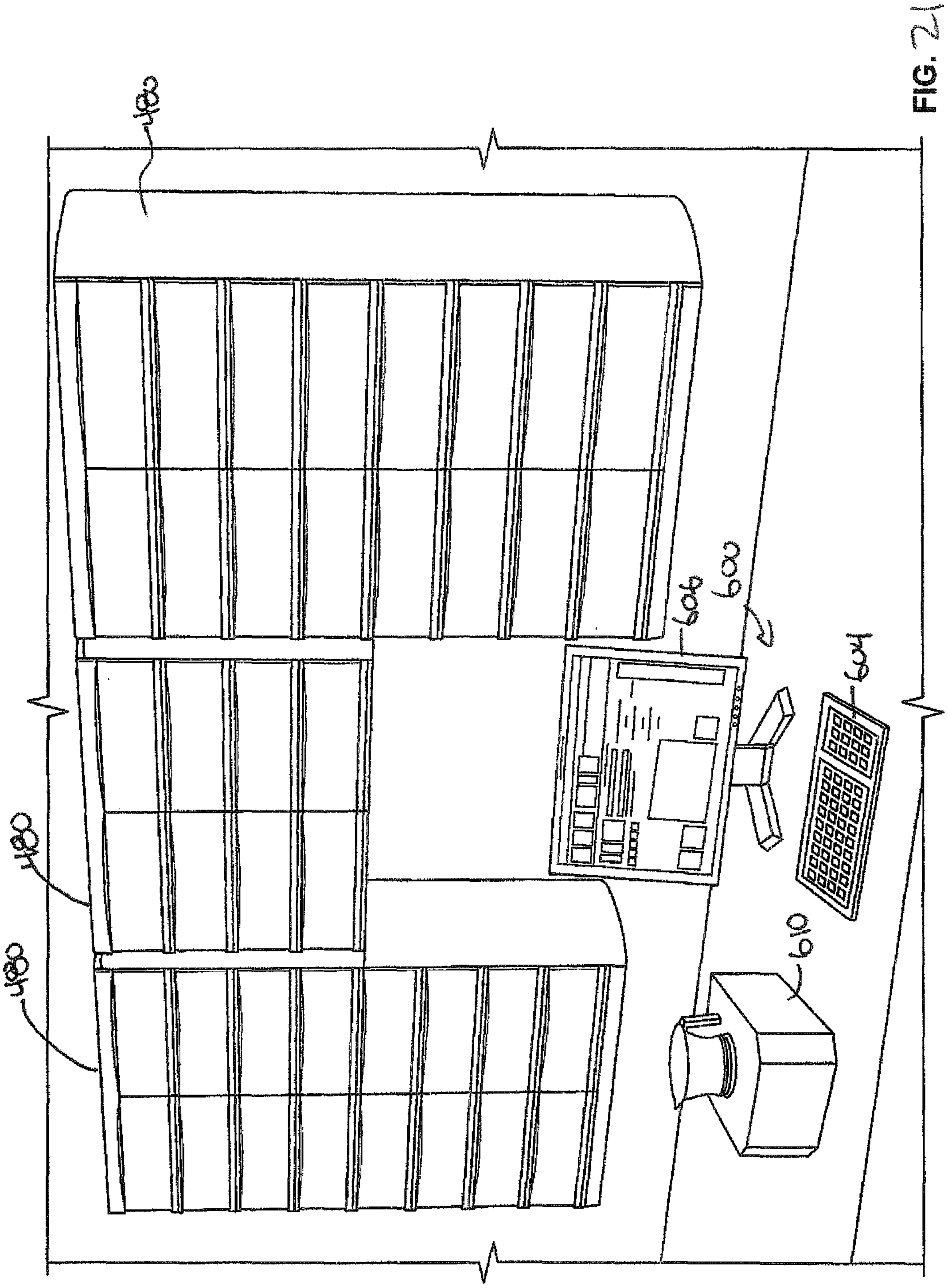
FIG. 21 is a perspective view of a system in accordance with an embodiment of the present disclosure.

As further shown, the receptacle can have a front lower lip region 1400 that covers a fixed indicator light 1450 or LED positioned in the shelf openings. The front lower lip region 1400 may have transparent or translucent qualities, such that when the receptacle is fully closed and the light is turned on, the user would be able to see the light through the front lower lip region 1400. Referring now to FIG. 21 there is shown, from various components described in the present disclosure, a blending control system 600 for manually preparing a hair dye mixture. The blending control system generally includes a computer-driven system having one or more of the following elements: (a) a memory, (b) input controls 604, and/or (c) a display 606. The blending control system further includes at least one formula stored in the memory. The formula defines instructions of one or more colorants and/or dye blending materials and amounts recommended for manually recreating a hair dye mixture. The blending control system also includes a scale 610 in communication (wireless or wired) with the system. The blending control system further includes bins in communication with the blending control system. As explained above, the receptacles may include indicators and/or locks.

It is further provided that the above noted software functions are defined to be created within a single or multiple software components. These components can be designed to work together regardless of the software language used to create the functions. Furthermore, the software would be specifically configured to perform the functions in order to impart structural elements into the software and the embodiments disclosed herein.

In one further embodiment of the present disclosure, there is provided a method for preparing a hair dye mixture, either manually, semi-manually, or automatically as defined above. The method to be performed would use a scale and control system in communication with each other. The control system provides for a memory and a display, with the memory containing a formula defining instructions for blending a hair dye mixture. The instructions are displayed on the display for a stylist or user to perform the various steps, which include viewing the display of instructions and then following the instructions by adding to a receptacle on the scale, colorant(s) and dye blending material(s) in accordance with the instructions. The heart of the embodiment is based on the critical fact that the stylist is using a hair color manufacturers' standardized packaging, such that non-standardized or specialized packaging of colorants and/or dye blending materials are not required. Terminology is as defined above.

In other aspects of this embodiment, the method continues with the steps of viewing the display of an indicator of an amount of one or more of the colorant(s) and/or dye blending material(s) which has been added to the receptacle. The indicator further indicates pre-defined tolerances above and below a recommended amount defined by the formula. Based thereon, the stylist adds to and/or removes from the receptacle colorant or dye blending material until the indicator shows the amount in the receptacle is within the pre-defined tolerances. In addition, the indicator may further include lights, sounds, and/or graphics.

Other aspect of this embodiment may include the step of validating the colorant and/or dye blending material being added to the receptacle by comparing the hair color manufacturers' standardized packaging against the formula. The validating step may include using a scanner to scan the hair color manufacturers' standardized packaging and checking the display for an indication that the scanned hair color manufacturers' standardized packaging is listed by the formula. In yet other aspects, the method may include the stylist accepting a weight of a colorant or dye blending material in the receptacle on the scale, and then adding additional colorant(s) or dye blending material(s) to the receptacle on the scale in response to the control system displaying an adjusted formula calculated by the control system. The adjusted formula is based on the accepted weight of the colorant or dye blending material in the receptacle when the accepted weight is different than a recommended amount defined by the formula.

In addition, the stylist may verify and accept a weight of a colorant or dye blending material in the receptacle on the scale, prior to adding subsequent colorant(s) or dye blending material(s) to the receptacle on the scale in accordance to the formula. The stylist may also weigh the receptacle on the scale, when the receptacle holds a remaining amount of colorant and/or dye blending material (after use). The remaining weight is defined to include only a portion of the colorant and/or dye blending material previously prepared in accordance with the instructions. In this instance, the control system is capable of revising the stored instructions based on the remaining amount of colorant and/or dye blending material in the receptacle compared to an amount of colorant and/or dye blending material previously prepared.

As outlined by the various figures, there are provided various systems and methods to perform specific functions of the various embodiments. In one embodiment there is provided a system for preparing a hair dye mixture. The system includes a control system having at least a memory, input controls, and a display. At least one formula is stored in the memory, and the formula contains one or more colorants and/or dye blending materials and amounts recommended for recreating a hair dye mixture. A scale is provided and is in communication with the control system, with monitoring software to monitor a weight on the scale. In addition, software for displaying the formula on the display in response to a manual input from the input controls is provided. The embodiment further includes indication software configured to display an amount of the colorants(s) and/or dye blending material(s) required to be added to the scale and further configured to indicate the recommended amounts in comparison to the amount that has been added to the scale. Tolerance indication software is also provided and configured to indicate predefined ranged tolerances above and/or below the recommended amounts, such that a user is able to identify whether the amount added to the scale for a colorant and/or dye blending material is within the predefined ranged tolerances.

The tolerance indications can be lines on a pictorial graph, or audible signals. A further warning signal can be provided to indicate when the amount on the scale for a colorant and/or dye blending material is outside the predefined ranged tolerances.

In another embodiment there is provided a system for preparing a hair dye mixture, the system including a control system having at least a memory, input controls, and a display and at least one formula stored in the memory. The formula defining instructions of one or more colorants and/or dye blending materials and amounts recommended for recreating a hair dye mixture. Each colorant and/or blending material is separately assigned to a first product brand, such that brand selection software can be configured to receive a manual input from the input controls to change a colorant and/or blending material from the first product brand to a second product brand. Brand adjusting software would be configured to adjust the formula of the hair dye mixture from the first product brand to the second product brand in response to the manual input. The brand selection software may further be configured to receive a single manual input from the input control to change all of the colorant(s) and/or blending material(s) from the first product brand to a second product brand, such that the brand adjusting software can adjust the formula of the hair dye mixture from the first product brand to the second product brand in response to the manual input.

The conversion from one brand to another brand may be based on a predetermined formulated brand conversion ratio or adjustment bracket. Once converted the adjusted formula may be stored in the memory.

In another embodiment there is provided a system for preparing a hair dye mixture. The system includes a control system having at least a memory, input controls, and a display, along with at least one formula stored in the memory, the formula defining instructions including one or more colorants and/or dye blending materials and amounts recommended for recreating a hair dye mixture. The embodiment further includes software for displaying the instructions on said display in response to a manual input from the input controls, and formula adjustment software configured to receive an adjustment protocol input from the input controls, the adjustment protocol input being further defined as a change in the instructions to the formula. The formula adjusting software is further configured to adjust the formula of the hair dye mixture when in accordance with the adjustment protocol input such that the formula adjusting software defines an adjusted formula. The formula adjusting software is further configured to display the adjusted formula on the display.

The adjustment protocol input can be based on a removal, addition, or substitution of one or more colorants and/or dye blending materials. As such the system can determine if additional colorants or blending materials need to be added or removed in response to the change.

In another embodiment, there is provided a system for preparing a hair dye mixture, which includes a control system having at least a memory, input controls, and a display and a scale in communication with the control system. Monitoring software is provided and configured to monitor a weight on the scale along with software configured to display the instructions on said display in response to a manual input from the input controls. The embodiment further includes memory having information stored thereon, wherein the information includes (a) at least one client and associated client data, (b) at least one formula defining instructions of one or more colorants and/or dye blending materials and amounts recommended for recreating a hair dye mixture, and/or (c) inventory data relating to the colorants and/or dye blending materials available for recreating a hair dye mixture, and the information further includes an employee information and corresponding employee identification. The embodiment is then able to include identification software configured to prevent access to the information and/or scale, and the identification software further configured to allow access to the information and/or scale when an entered identification matches an employee identification. The entered identification may be associated with one or more of the following: a magnetic card scanner, a fingerprint scanner, a barcode reader, and a password.

In another embodiment of the present disclosure there is provided a system for preparing a hair dye mixture, having a control system having at least a memory, input controls, and a display; a scale in communication with the control system; monitoring software configured to monitor a weight on the scale; and software configured to display the instructions on the display in response to a manual input from the input controls. The memory has information stored thereon, including (a) at least one client and associated client data, (b) at least one formula defining instructions of one or more colorants and/or dye blending materials and amounts recommended for recreating a hair dye mixture, and/or (c) inventory data relating to the colorants and/or dye blending materials available for recreating a hair dye mixture. The embodiment further includes inventory software configured to calculate an inventory level of the one or more colorants and/or dye blending materials by reducing a current inventory level by an amount used during the manual preparation of a hair dye mixture and by increasing the current inventory level by an amount received during a new shipment; and the inventory software may be further configured to receive and store an actual inventory level of the one or more colorants and/or dye blending materials based on a manual input and/or weight on a scale. Lastly, reporting software is provided and configured to create a report based on an inventory shrinkage when a current calculated inventory level is compared to an actual inventory level. This can further be based on costs such that the inventory shrinkage reports can include final costs.

In yet another embodiment there is provided a system for preparing a hair dye mixture, having a control system having at least a memory, input controls, and a display; a scale in communication with the control system; monitoring software configured to monitor a weight on the scale; and memory having information stored therein. The information includes (a) at least one client and associated client data, (b) at least one formula defining instructions of one or more colorants and/or dye blending materials and amounts recommended for recreating a hair dye mixture, and/or (c) cost associated with each one or more colorants and/or dye blending materials, and the information further includes at least one employee information and corresponding employee identification. Tracking software is provided and configured to store on the memory a final amount used of each of the one or more colorants and/or dye blending materials defined by the formula during creation of a hair dye mixture and an associated cost of the creation of the hair dye mixture. The tracking software may be further configured to link the associated cost to an employee. Reports based on the final costs/average costs can be generated for specified time periods. In addition, the tracking software can report on an amount of the one or more colorants and/or dye blending materials used by an employee as well as the remaining amounts when the mixture is weighed after application. Final costs of product used versus amounts charged can be reviewed and charted. In addition, high use or low use materials can be determined for stocking and ordering as well as purchase incentive programs. Generated purchasing orders can be calculated and automatically sent to third party venders.

Furthermore, with the knowledge of which products are being used and with the system potentially linked to the salon management portion of the system, further forecasting of the salon needs can be determined. With appointments logged with the type of service and formulas that will be generated, reports can be generated to determine how much of a product needs to be in stock as well as actual inventory levels and reports on which products needs to be ordered. Generating and sending purchase orders when needs are determined may be done either automatically or upon review and approval by the salon manager.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover all such modifications.

The invention claimed is:

1. A method for color conversion of a hair dye color mixture using a control system having at least a processor, a memory, and user input controls for receiving user input, the memory configured to store customer history data, the customer history data including one or more of stored formulas and photographs, the method comprising:

receiving user input to recreate a selection in the customer history data with the hair dye color mixture in a new product brand;

duplicating the color of the selection in the customer history data using ingredients in the new product brand, in response to the user input; and initiating displaying instructions to recreate the hair dye color mixture using the ingredients in the new product brand.

2. The method of claim 1, further comprising: preventing access to the control system until an entered identification code matches an employee identification code.

3. The method of claim 1, further comprising: calculating an inventory level of the one or more ingredients of the hair dye color mixture by reducing a current inventory level by an amount used during manual preparation of a hair dye mixture and by increasing the current inventory level by an amount received during a new shipment.

4. The method of claim 1, further comprising:

receiving an input from the user input controls to change all of the ingredients of the hair dye color mixture to the new product brand, and adjusting a formula of the hair dye mixture to the new product brand in response to the input.

5. The method of claim 1, further comprising: tracking a final amount used of each of the one or more ingredients of the hair dye color mixture in the new product brand and an associated cost of the hair dye mixture in the new product brand.

6. The method of claim 1, further comprising: providing a scale in communication with the control system that is configured to monitor a weight on the scale.

7. The method of claim 1, wherein the input to match the color of the hair dye color mixture includes removing a particular ingredient from the formula.

8. The method of claim 1, wherein the input to match the color of the hair dye color mixture includes adding a particular ingredient to the formula.

9. The method of claim 1, wherein the input to match the color of the hair dye color mixture includes changing a particular ingredient with another ingredient.

10. A system for preparing a hair dye color mixture, the system comprising:

a control system having at least one processor, a memory, and user input controls that receive user input, the memory storing customer history data in the memory, the customer history data including one or more of photographs and stored formulas of a hair dye color mixture, the memory further storing a set of instructions that when executed by the at least one processor, causes the at least one processor to:

receive user input to recreate a selection in the customer history data with the hair dye color mixture in a new product brand;

duplicate the color of the selection in the customer history data using ingredients in the new product brand, in response to the user input; and initiate display instructions to recreate the hair dye color mixture using the ingredients in the new product brand.

11. The system of claim 10, wherein the system prevents access to the control system until an entered identification code matches an employee identification code.

12. The system of claim 10, wherein the system calculates an inventory level of the one or more ingredients of the hair dye color mixture by reducing a current inventory level by an amount used during manual preparation of a hair dye mixture and by increasing the current inventory level by an amount received during a new shipment.

13. The system of claim 10, wherein the system receives an input from the user input controls to change all of the ingredients of the hair dye color mixture to the new product brand, and adjusts a formula of the hair dye mixture to the new product brand in response to the input.

14. The system of claim 10, wherein the system tracks a final amount used of each of the one or more ingredients of the hair dye color mixture in the new product brand and an associated cost of the hair dye mixture in the new product brand.

15. The system of claim 10, further comprising: a scale in communication with the control system that is configured to monitor a weight on the scale.

16. The system of claim 10, wherein the input to match the color of the hair dye color mixture includes removing a particular ingredient from the formula.

17. The system of claim 10, wherein the input to match the color of the hair dye color mixture includes adding a particular ingredient to the formula.

18. The system of claim 10, wherein the input to match the color of the hair dye color mixture includes changing a particular ingredient with another ingredient.

19. A method for color conversion of a hair dye color mixture using a control system having at least a processor, a memory, and user input controls for receiving user input, the memory configured to store customer history data, the customer history data including one or more of stored formulas and photographs, the method comprising:

receiving user input to recreate a selection in the customer history data with the hair dye color mixture in a new product brand;

duplicating the color of the selection in the customer history data using ingredients in the new product brand, in response to the user input; and recreating the hair dye color mixture using the ingredients in the new product brand.

20. The method of claim 19, further comprising: storing the ingredients of the recreated hair dye color mixture in the new product brand in the memory.

* * * * *